United States Patent [19]
Aida et al.

[11] Patent Number: 5,896,961
[45] Date of Patent: Apr. 27, 1999

[54] DYNAMIC VIBRATION ABSORBER

[75] Inventors: Yasuhiko Aida, Yokohama; Hiroshi Niwa, Tokyo; Yuji Maeda, Yokohama, all of Japan

[73] Assignee: Kabushiki Kaisha Toshiba, Kawasaki, Japan

[21] Appl. No.: 08/720,571

[22] Filed: Oct. 1, 1996

[30] Foreign Application Priority Data

Oct. 2, 1995 [JP] Japan .................................. 7-254788
Feb. 22, 1996 [JP] Japan .................................. 8-034717
Apr. 22, 1996 [JP] Japan .................................. 8-099890

[51] Int. Cl.$^6$ ........................................................ F16F 7/10
[52] U.S. Cl. ........................... 188/378; 188/267; 335/285
[58] Field of Search ................................. 188/267, 378, 188/379, 380; 335/285, 306; 310/51

[56] References Cited

U.S. PATENT DOCUMENTS

| | | | |
|---|---|---|---|
| 3,423,614 | 1/1969 | Poteate et al. | 188/267 X |
| 4,314,623 | 2/1982 | Kurokawa | 188/379 X |
| 4,935,651 | 6/1990 | Hong et al. | 310/51 |
| 5,445,249 | 8/1995 | Aida et al. | 188/267 X |

*Primary Examiner*—Peter M. Poon
*Assistant Examiner*—Pamela J. Lipka
*Attorney, Agent, or Firm*—Finnegan, Henderson, Farabow, Garrett & Dunner, L.L.P.

[57] ABSTRACT

A dynamic vibration absorber comprises a movable portion including a movable weight portion, a movable portion magnet assembly provided with a movable inside magnet and a movable outside magnet which are mounted to the movable weight portion through a yoke so as to alternately provide different magnetic poles, a fixed portion fixed to an object to be damped, a fixed portion magnet assembly provided with a fixed portion inside magnet and a fixed portion outside magnet mounted to the fixed portion through a yoke so that the fixed portion magnet assembly has magnetic poles different from those of the movable portion magnet in opposed positions, respectively, and a conductor plate disposed in a gap defined between the fixed portion magnet assembly and the movable portion magnet assembly.

7 Claims, 19 Drawing Sheets

DYNAMIC VIBRATION ABSORBER

BACKGROUND OF THE INVENTION

The present invention relates to a dynamic vibration absorber capable of suppressing vibrations in horizontal two-dimensional directions of a target or object structure.

Generally, a dynamic vibration absorber includes an additional weight portion which is subjected to a force of inertia by vibrations, a rigidity element for generating a reaction force to the inertia force applied to the additional weight portion and a damping element for absorbing vibration energy.

A conventional dynamic vibration absorber is constructed such that vibrations in a specified direction of an object structure are suppressed by vibrating an additional weight portion. Hence, if there are a plurality of directions in which vibrations are to be controlled, the vibration controlling equipment must contain the same number of dynamic vibration absorbers as that of directions of vibrations.

One example of the conventional dynamic vibration absorber will be described with reference to FIGS. 28A and 28B.

In FIGS. 28A and 28B, an object structure 301 to be damped placed on a floor 300 has two vibration directions of the x- and y- axis. On the object structure 301 are placed two dynamic vibration absorbers 302 corresponding to the directions of the vibrations. Each of the dynamic vibration absorbers 302 is locked to a locking structure 305. In each of the dynamic vibration absorbers, an additional weight portion 302a is supported by both a rigidity element 303 and a damping element 304.

In each of the dynamic vibration absorbers 302, when vibrations are generated in the object structure 301, the damping elements 304 reduce vibration energy while the rigidity elements 303 apply reaction forces to the force of inertial generated in the additional weight portions 302a. Thus, the dynamic vibration absorbers 302 provide the damping effect for the vibrations in the x- and y-axis directions, respectively. In other words, in the conventional dynamic vibration absorbers, the single dynamic vibration absorber is provided to surpress vibration in one direction, that is, one for the horizontal direction and the other for the vertical direction as in FIG. 28B.

In the conventional dynamic vibration absorbers of the structure described above, there is no problem in a case where there is a large space for installation of the dynamic vibration absorbers and a plurality of dynamic vibration absorbers can be hence provided in a large object structure, such as a building. However, where there is a limitation to the installation space for the dynamic vibration absorbers and where damping in a plurality of directions is required, as in a machinery, it is difficult to adequately install the vibration controlling devices having a conventional structure in which the directions of a vibrations of the additional weight portions are determined.

SUMMARY OF THE INVENTION

An object of the present invention is to substantially eliminate defects or drawbacks encountered in the prior art described above and to provide a dynamic vibration absorber capable of reducing vibration in a two-dimensional direction by a small, light and simple arrangement.

Another object of the present invention is to provide a dynamic vibration absorber having a small magnetic spring type damper structure capable of reducing the vibration of an object to be damped in a two-dimensional direction with high reliability.

A further object of the present invention is to provide a small and light dynamic vibration absorber with a simple arrangement capable of reducing a vibration and further following a vibration of a two-dimensional direction by a single body.

These and other objects can be achieved according to the present invention by providing, in one aspect, a dynamic vibration absorber comprising:

a movable portion including a movable weight portion;

a movable portion magnet assembly provided with a movable inside magnet and a movable outside magnet which are mounted to the movable weight portion through a yoke so as to alternately provide different magnetic poles;

a fixed portion fixed to an object to be damped;

a fixed portion magnet assembly provided with a fixed portion inside magnet and a fixed portion outside magnet mounted to the fixed portion through a yoke so that the fixed portion magnet assembly has magnetic poles different from those of the movable portion magnet in opposed positions, respectively; and a conductor plate disposed in a gap defined between the fixed portion magnet assembly and the movable portion magnet assembly.

In preferred embodiments, the dynamic vibration absorber further comprises a movable portion bearing receiving seat disposed to the movable portion, a fixed portion bearing receiving seat disposed to the fixed portion and rigid balls held between the movable portion bearing receiving seat and the fixed portion bearing receiving seat for permitting a relative motion between the movable portion and the fixed portion and the movable portion bearing receiving seat, and the movable portion bearing receiving seat and the fixed portion bearing receiving seat are disposed inwardly of the movable portion outside magnet and the fixed portion outside magnet, respectively.

The dynamic vibration absorber further comprises bearing support rings disposed in a gap between the movable portion inside magnet and the movable portion outside magnet and a gap between the fixed portion inside magnet and the fixed portion outside magnet, respectively, to thereby fix the movable portion bearing receiving seat and the fixed portion bearing receiving seat, respectively, and comprises a movable portion conductor plate which is fixed to the movable weight portion and to which the movable portion bearing receiving seat is fixed integrally therewith, a fixed portion conductor plate which is fixed to the fixed portion and to which the fixed portion bearing receiving seat is fixed integrally therewith, and rigid balls held between the movable portion bearing receiving seat and the fixed portion bearing receiving seat to permit a relative motion between the movable portion and the fixed portion.

At least one intermediate magnet is disposed between the movable portion magnet assembly and the fixed portion magnet assembly through bearing receiving seats and rigid balls and is provided with magnets of different magnetic poles disposed to an upper portion and a lower portion across a yoke, in an installed state, in a manner of opposing to the movable portion magnet assembly and the fixed portion magnet assembly.

The fixed portion outside magnet having the same magnetic pole as that of the movable portion outside magnet is disposed outwardly of the fixed portion outside magnet confronting the movable portion outside magnet.

In the dynamic vibration absorber having the arrangements or structures in the above aspect, when the movable weight portion moves from a stationary position, that is, when the confronting magnets are dislocated in a horizontal direction, an attracting force acts between the different magnetic poles confronting at the stationary position, whereas a repelling force acts when the same adjacent magnetic poles approach each other. These forces act as a restoring force for returning the amount of movement of the movable weight portion to its original value with respect to the movement in any optional two-dimensional direction. Further, magnetic flux passing through the conductor plate interposed between the confronting magnets effects a relative motion with respect to the conductor plate as the movable weight moves and the relative motion acts as a magnetic damping force caused by an eddy current loss produced to the conductor plate.

When an external force such as an earthquake is applied to an object to be damped, the vibration of the object itself can be greatly reduced by the vibration of the movable weight in such a manner that a spring constant/damping coefficient given by the magnetic spring/damper element is adjusted in accordance with the vibration characteristics of the structure to be damped based on the known theory of a dynamic vibration absorber and then the dynamic vibration absorber in which the movable weight is supported by the magnetic spring/damper element is installed at a position to which a greatest amplitude is given when the object to be damped is vibrated.

Furthermore, the outside dimension of the movable portion of the dynamic vibration absorber is reduced as small as the dimension of the magnets necessary to obtain magnetic spring characteristics by keeping the gap between the confronting magnets constant and installing the bearing structure between the confronting magnets to smoothly move the movable weight portion in a two-dimensional direction, thus the size of the absorber being reduced as a whole.

Still furthermore, when the movable portion is displaced particularly in a large amount, the outermost peripheral magnets of the movable portion have the same magnetic poles and a repelling force is applied by such an arrangement that the multi-structure of the fixed portion side magnets is increased with respect to the movable portion side magnets in the magnetic spring/damper element and the range where the fixed portion magnets are installed is increased in a radial direction. Consequently, a restoring force is prevented from being lowered even in the region where displacement is carried out in a large amount and the linearity of magnetic spring characteristics can be maintained.

The movable range (stroke) of the movable portion of the dynamic vibration absorber can be increased without changing an external dimension by such an arrangement that at least one stage of the intermediate magnet is added through the bearing structure in the magnetic spring/damper element to thereby construct the magnet of the multi-layer structure. Consequently, the case in which damping of a large amplitude is required can be coped with.

In another aspect according to the present invention, there is provided a dynamic vibration absorber comprising:

a fixed portion fixed to an object to be damped;

a fixed portion magnet assembly mounted to the fixed portion;

a movable support portion mounted to the fixed portion and moving in a two-dimensional direction;

a movable portion supported by the movable support portion and including a movable weight portion mounted to the movable support portion so as to be movable in a two-dimensional direction;

a movable portion magnet assembly mounted to the movable weight portion in confrontation with the fixed portion magnet assembly; and a conductor plate interposed between the fixed portion magnet assembly and the movable portion magnet assembly.

In preferred embodiments, the fixed portion includes a fixing frame and a fixing plate mounted on the fixing frame, the movable support portion is mounted under the fixing frame, the fixed portion magnet assembly is mounted to the fixing plate, and the absorber further comprises a collision unit mounted to a side of the fixing frame for restricting a movable range of the movable portion magnet assembly and the movable weight portion and a buffer material interposed between the movable weight portion and the movable support portion.

The movable support portion includes first straight rails mounted in an arbitrary direction of the fixed portion, first sliders moving linearly by being supported by the first linear rails, second linear rails mounted on the first sliders in a direction perpendicular to the first linear rails, second sliders moving linearly in a manner supported by the second linear rails and movable portions mounted on the second sliders. Additional weights may be provided to the second linear rails of the movable support portion.

Spring members are disposed to end portions of the first linear rails or the second linear rails disposed to the movable support portion for producing a force in accordance with amounts of movement of the sliders.

The dynamic vibration absorber further comprises an inter-magnet gap adjusting unit for adjusting a gap between the fixed portion magnet assembly and the movable portion magnet assembly.

The movable support portion has a rotation support portion disposed to the fixed portion, a first arm horizontally rotatably mounted to the rotation support portion, a second arm horizontally rotatably mounted to the first arm and a movable member mounted to the second arm.

There is also provided a dynamic vibration absorber comprising:

a fixed portion fixed to an object to be damped;

a fixed portion magnet assembly mounted to the fixed portion;

a movable portion including a movable weight portion;

a movable portion magnet assembly mounted to the movable weight portion and disposed so as to confront the fixed portion magnet assembly;

a conductor plate interposed between the fixed portion magnet assembly and the movable portion magnet assembly on a side of the fixed portion magnet assembly;

a sliding plate interposed between the fixed portion magnet assembly and the movable portion magnet assembly on a side of the movable portion magnet assembly;

a first contact support portion mounted to the movable portion magnet assembly in contact with the sliding plate for supporting an attracting force between the fixed portion magnet assembly and the movable portion magnet assembly; and a second contact support portion mounted to the movable weight portion through a predetermined gap to the fixed portion.

The fixed portion includes a fixing frame and a fixing plate mounted on the fixing frame, the fixed portion magnet and the conductor plate are mounted to the fixing plate, and the absorber further comprises a collision unit mounted to a side of the fixing frame for restricting a movable range of the movable portion magnet assembly and the movable weight portion and a buffer material mounted to the movable weight portion.

The first and second contact support portions are at least partially composed of a sliding material having a flat surface or curved surface.

The fixing frame is a gas tight vessel and filled up with an arbitrary liquid by closing a space containing the movable portion magnet assembly and the movable weight portion.

Anther movable portion magnet assembly is mounted to the movable weight portion and another fixed portion magnet assembly confronting the another movable portion magnet assembly is mounted to the fixed portion.

There is also provided a dynamic vibration absorber comprising:

a fixed portion fixed to an object to be damped;

a fixed portion magnet assembly mounted to the fixed portion;

a first surface receiving seat mounted to the fixed portion magnet;

a movable portion including a movable weight portion;

a movable portion magnet assembly mounted to the movable weight portion and disposed so as to oppose to the fixed portion magnet assembly;

a second surface receiving seat mounted to the movable portion magnet assembly;

rigid balls held between the first and second surface receiving seats of the fixed portion magnet assembly and the movable portion magnet assembly; and a locking unit composed of a two-stage parallel ling and interposed between the movable weight portion and the fixed portion.

The dynamic vibration absorber further comprises another locking unit composed of first rails mounted to the fixed portion, first sliders for moving the first rails, a second rail mounted to the first sliders so as to be perpendicular to the first rails and a second slider moving along the second rail and mounted to the movable weight portion.

According to the arrangements or structures in the another aspect of the present invention, the following functions and effects will be achieved.

Since the movable support portion mounted to the fixed portion permits the movement of the movable weight portion and the movable portion magnet in the two-dimensional direction, receiving seats and rigid balls disposed between magnets as in the conventional example are not required, no hole need not be defined to the conductor plate and the conductive plate can be made relatively thin. With this arrangement, the gap between the magnets can be reduced and the size of the magnets can be made relatively small. Further, since the restriction of a movable range as in the conventional example is removed, a small absorber with high reliability can be arranged.

Since movement in a two-dimensional direction is permitted by the movable weight portion and the movable portion magnet mounted on the movable support portion fixed under the fixing frame to which an object to be damped is fixed and the fixed portion magnet is mounted on the fixing frame through the fixing plate, it suffices for the movable support portion only to support a load obtained by subtracting the entire weight of the movable portion from the attracting force between the fixed portion magnet and the movable portion magnet, thus the size of the movable support portion being reduced. Further, since the movable range of the movable weight portion and the movable portion magnet is restricted by the collision unit mounted to the fixed portion and the buffer material mounted to the movable weight portion, even if an unexpectedly large force is applied to the object to be damped, the movable support portion receives no excessive load, thus the reliability of operation can be maintained.

Since the movable support portion which permits the movement of the movable weight portion and the movable portion magnet while supporting them in an arbitrary two-dimensional direction is realized by the combination of the linear rails and the sliders in two perpendicular directions, there is no restriction for a movable range as in the conventional example, thus an absorber of high reliability being arranged. Further, since a movable weight is made different by the weight of the second linear rails in the two perpendicular directions by the second linear rails mounted on the first sliders, the absorber can be mounted in accordance with the direction dependency of the natural frequency of the object to be damped.

Since the difference between the damping frequencies of the absorber in the two perpendicular directions can be adjusted in accordance with the direction dependency of the natural frequency of the object to be damped by that the additional weights can be mounted to the (second) rails of the movable support portion on the movable side which is composed of thereof where the linear rails and the sliders in the two perpendicular directions are assembled, a damping performance can be more improved.

Since a magnetic spring force resulting from the fixed portion magnet and the movable portion magnet can be supplemented by the provision of the spring portions producing a force in accordance with the moving amount of the sliders at the ends of the linear rails of the movable support portion composed of the combination of the linear rails and the sliders in the two perpendicular directions, the outside diameters of the movable portion magnet and the fixed portion magnet can be reduced, thus the size of the damper can be also reduced as a whole.

Since the provision of the inter-magnet gap adjusting unit for arbitrarily adjusting the gap between the fixed portion magnet and the movable portion magnet permits the adjustment of a magnetic attracting force and a repelling force between the magnets, a magnetic spring force can be arbitrarily adjusted in accordance with the natural frequency of the object to be damped. With this arrangement, the secular change and the like of the natural frequency of the object to be damped can be coped with.

Since the movable support portion for moving the movable weight portion and the movable portion magnet, while supporting them in an arbitrary two dimensional direction, is realized by the horizontal arms having two degrees of freedom, a movable range is not restricted, thus an absorber of high reliability being arranged. Further, since the movable support portion can be arranged by the relatively small number of parts, reliability is further improved.

Since movement in a two-dimensional direction is permitted while supporting an attracting force between the magnets in contact with the sliding plate interposed between the fixed portion magnet and the movable portion magnet through the contact support portion mounted to the movable portion magnet, holes required to the conventional example need not be defined to the conductor plate and a sufficient magnetic damping force can be obtained even by a relatively thin conductor plate. Further, the restriction in a movable range as in the conventional example is removed. Even if a large force is applied in the direction toward which the magnets are separated from each other, movement in a two-dimensional direction is permitted while supporting the force by the contact support portion mounted to the fixed portion and the movable weight portion. Since the movable support portion can be realized by the relatively simple arrangement, the size of the damper can be reduced and the reliability thereof can be improved.

Since the sliding resistance force of the contact support portion resulting from the movement of the movable weight portion and the movable portion magnet is reduced by the use of the rollers each having a spherical body to the contact portion as the contact support portion, an excellent damping effect can be obtained even in the region the object to be damped where it has a relatively small vibration, thus the performance of the absorber being improved. Further, the movable range of the movable weight portion and the movable portion magnet is restricted by the collision unit mounted to the fixed portion and the buffer material mounted to the movable weight portion, even if an unexpectedly large force is applied to the object to be damped, the range in which a magnetic spring force acts can be restricted to the movable range, thus reliability being improved.

The structure can be simplified by the use of the sliding member having the flat surface or the spherical surface as the contact support portion to the support portion, thus a less expensive absorber of high reliability being arranged.

A resistance force resulting from the movement of the movable support portion is reduced by the movement of the movable weight portion and the movable portion magnet in the closed vessel filled up with the lubrication oil. Therefore, a damping effect can be obtained in the range where the vibration of the object to be damped is relatively small, thus the performance of the absorber being improved. Further, since each sliding portion is located in the lubricant, the wear of each portion is reduced and the reliability of the absorber can be improved.

Since the movable portion magnets are disposed on and under the movable weight portion, and the movable weight portion is attracted by the fixed magnets from the upper and lower sides thereof, a load at each sliding portion of the movable support portion is reduced and a resistance force resulting from sliding operation is also reduced, thus the performance and reliability of the absorber being improved.

Since the locking unit composed of the parallel link or the perpendicular linear rails and the sliders is disposed on the movable weight portion in the absorber in which two-dimensional movement is supported by the rigid balls and the surface receiving seat, the restriction of the movable range resulting from the rotation of the movable weight portion and the movable portion magnet is removed, thus the reliability of the absorber being improved.

In a further aspect of the present invention, there is further provided a dynamic vibration absorber comprising:

a movable portion including a movable weight portion;

a movable portion magnet assembly composed of a plurality of rectangular magnets magnetized in a vertical direction and longitudinally and laterally disposed on a horizontal surface of the movable weight portion, in an installed state, through a back yoke with a predetermined distance therebetween so that adjacent magnets have a different pole each other;

a fixed portion fixed to an object to be damped;

a fixed portion magnet assembly composed of a plurality of fixed portion magnets and having the same shape as that of the movable portion magnet assembly and longitudinally and laterally disposed to the object to be damped through a back yoke with a predetermined distance therebetween so as to confront the movable portion magnet assembly through poles different from those of the movable rectangular magnets;

a conductor plate disposed to a distance between the movable portion magnet assembly and the fixed portion magnet assembly so as not to be in contact therewith;

a movable portion bearing receiving seat disposed to the movable weight portion;

a fixed portion bearing receiving seat disposed to the object to be damped; and rigid balls held between the movable portion bearing receiving seat and the fixed portion bearing receiving seat to permit the movable weight portion to be horizontally movable.

In preferred embodiments, circular magnets are disposed in place of the rectangular magnets.

In the above arrangements, spaces are formed by widening the distances of the rectangular magnets or the circular magnets at the same positions of the movable portion magnet assembly side and the fixed portion magnet assembly side, the movable portion bearing receiving seat and the fixed portion bearing receiving seat are disposed to the spaces and the rigid balls are held therebetween.

The number of the longitudinally disposed rectangular magnets or circular magnets is made different from that of the laterally disposed rectangular magnets or circular magnets in the movable portion magnet assembly and the fixed portion magnet assembly.

An aspect ratio of the rectangular magnets is other than 1 in the movable portion magnet assembly and the fixed portion magnet assembly.

The back yoke has a honeycomb structure composed of a horizontal plate combined with a longitudinal rib.

In the dynamic vibration absorbers of the structures described above, on the movable weight portion, there is piled up at least one unit including another fixed portion magnet assembly composed of a plurality of rectangular magnets or circular magnets magnetized in a vertical direction and longitudinally and laterally disposed on a horizontal surface of the movable weight portion opposite to the side thereof, in an installed state, where the movable portion magnet assembly is disposed through a back yoke with a predetermined distance therebetween so that adjacent magnets have different poles each other, another movable portion magnet assembly each having the same shape as that of the another fixed portion magnet assembly and disposed to confront the another fixed portion magnet assembly through poles different from those of the another fixed portion magnet assembly, another movable weight portion to which the movable portion magnet assembly is disposed through a back yoke, another conductor plate disposed to a gap between the further movable portion magnet assembly and the another fixed portion magnet assembly so as not to be in contact therewith, a further movable portion bearing receiving seat disposed to the another movable weight portion, another fixed portion bearing receiving seat disposed to the movable weight portion, and rigid balls held between the another movable portion bearing receiving seat and the another fixed portion bearing receiving seat to permit the movable weight portion to be horizontally movable.

The numbers of the movable portion magnet assembly and the fixed portion magnet assembly disposed longitudinally and laterally with a predetermined gap therebetween are changed to permit an outermost peripheral shape of the movable portion magnet assembly and fixed portion magnet assembly to be arbitrarily set.

According to the arrangements or structures of the further aspect of the present invention, the following functions and effects will be achieved.

When the movable weight portion moves from a stationary position, that is, when the confronting magnets are displaced in a horizontal direction, an attracting force acts because the rectangular magnets or the circular magnets confronting at the stationary position have different poles each other, whereas a repelling force acts by the approach of the same poles to each other. These forces act as a restoring force for returning the amount of movement of the movable weight to its original value with respect to the movement in any two-dimensional direction. Further, magnetic flux passing through the conductor plate interposed between the confronting magnets effects a relative motion with respect to the conductor plate as the movable weight moves and the relative motion acts as a magnetic damping force caused by an eddy current loss produced to the conductor plate. A magnetic spring element and a magnetic damper element are arranged as described above, the spring constant and the damping coefficient thereof are adjusted in accordance with the vibration characteristics of the object to be damped based on the theory of a dynamic vibration absorber and then the dynamic vibration absorber in which the movable weight is supported by the magnetic spring/magnetic damper is installed on the object to be damped, so that the vibration of the object to be damped can be reduced. In particular, since a multiplicity of the magnets divided into the small rectangular magnets or circular magnets are disposed, the amount of area dislocated between the movable portion magnets and the fixed portion magnets is increased with respect to the movement of the movable magnets as compared with that of a large magnet having the same confronting area, whereby a large magnetic restoring force can be obtained.

When the great many number of the rectangular magnets or circular cross sectional magnets is disposed, since the rigid balls are also disposed in the intermediate portion of the disposed magnets, the deformation of the external surface of the movable portion magnets and fixed portion magnets is prevented as a whole and the gap therebetween is entirely maintained constant.

The ratio of magnetic spring constants in two-directions can be adjusted by changing the number of the rectangular magnets disposed longitudinally and the number thereof disposed laterally on the horizontal surface in the movable portion magnets and the fixed portion magnets.

The ratio of magnetic spring constants in two-directions can be adjusted as well as the degree of freedom of the aspect ratio of the disposed movable portion magnets and fixed portion magnet can be increased as a whole.

When the great many number of the rectangular magnets or circular cross sectional magnets are disposed, since the back york integrally formed with the movable portion magnets is composed of the honeycomb structure composed of the horizontal plate combined with the rib, the deformation of the external surface of the movable portion as a whole is prevented, the gap to the fixed portion can be maintained constant and the horizontal motion of the movable weight portion caused by the rolling of the rigid balls can be carried out without a resistance.

Since the plurality of movable weight portions are piled up and the respective movable weight portions are disposed in confrontation with each other with the multiplicity of the magnets whose number of disposition is arbitrarily adjusted, a plurality of frequencies can be coped with.

Since the outside shape of the dynamic vibration absorber can be arbitrarily set, the space where the magnets are disposed can be reduced as well as the space can suited to the shape of an object to be damped.

The nature and further features of the present invention will be made further clear from the following descriptions made with reference to the accompanying drawings, in which it is to be noted that, in some sectional figures, hatchings may be partially made.

DESCRIPTION OF THE PREFERRED EMBODIMENTS

A first embodiment of the present invention will be described hereunder with reference to FIG. 1 and FIG. 2.

Figure 1:
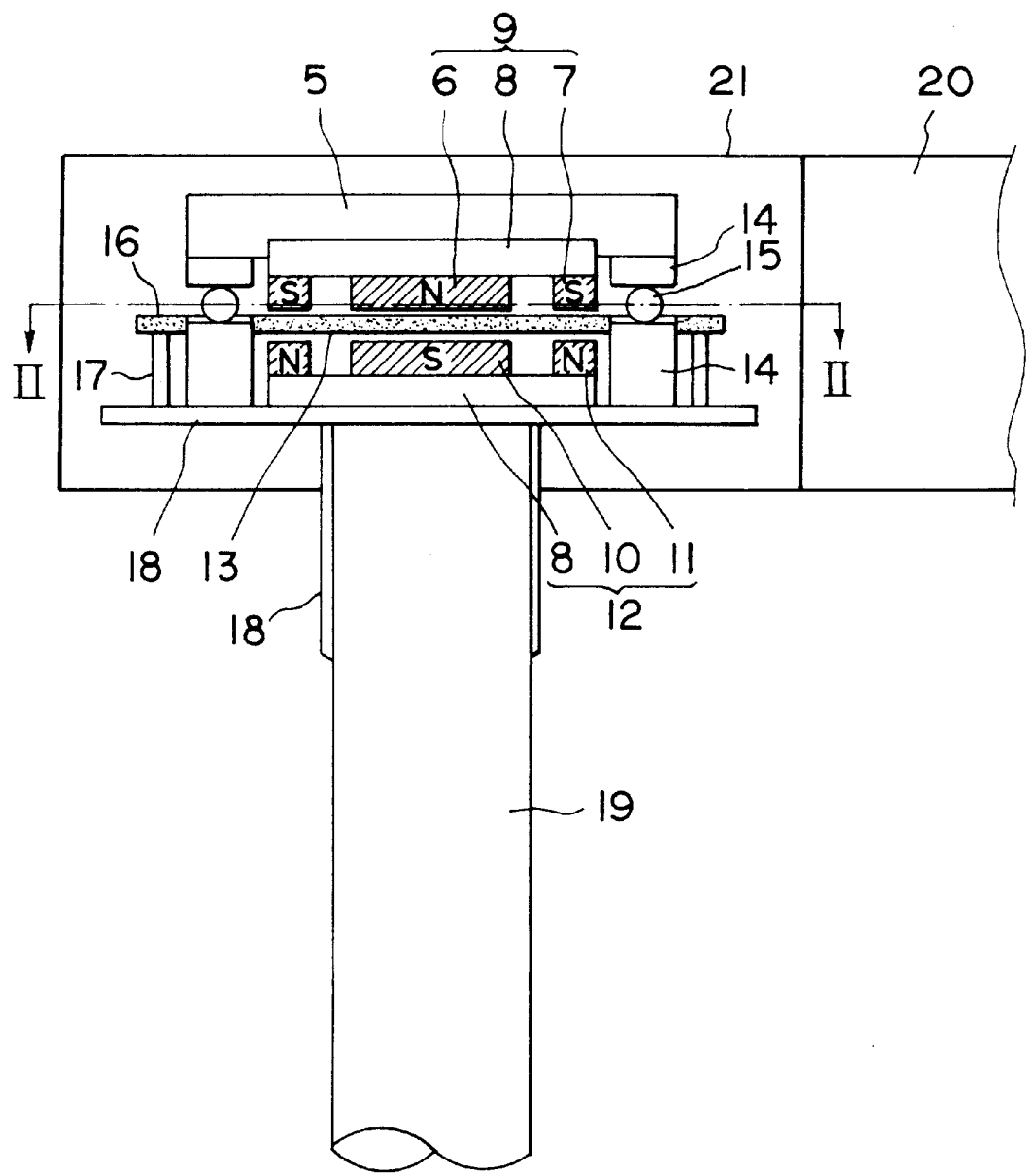
FIG. 1 is a longitudinal cross sectional view showing a first embodiment of a dynamic vibration absorber according to the present invention.
Figure 2:
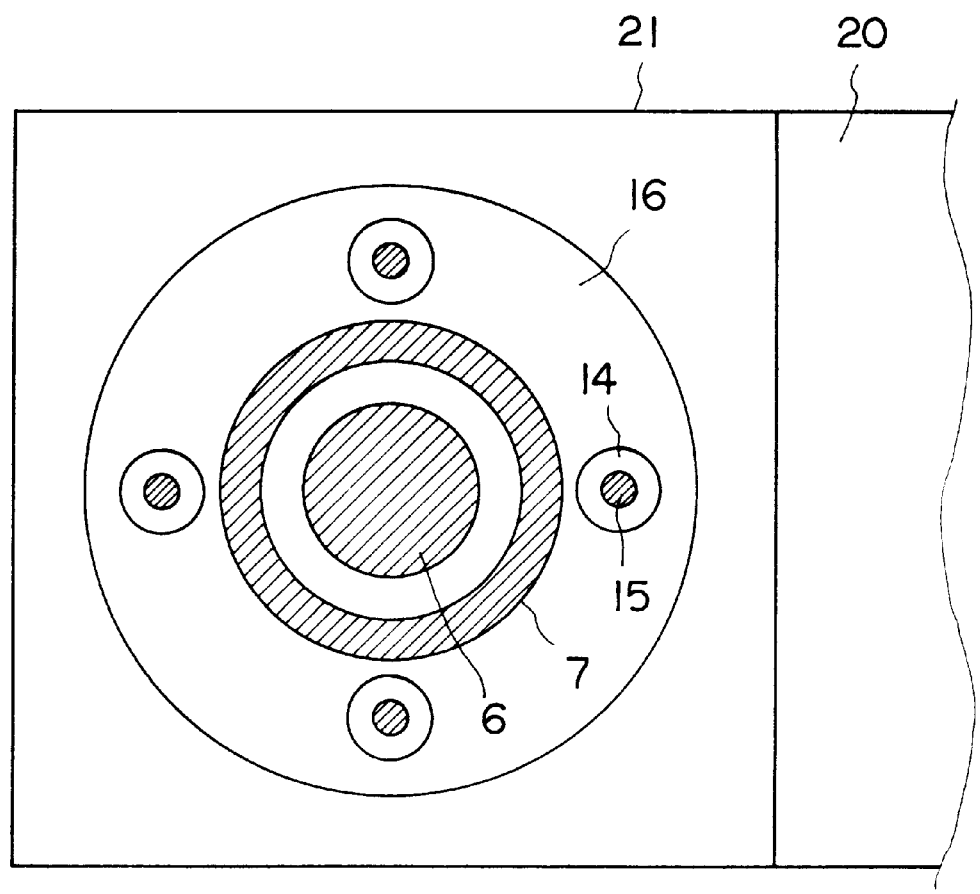
FIG. 2 is a cross sectional view taken along the line II—II in FIG. 1.

Referring to FIGS. 1 and 2, in the first embodiment, a multi-structural magnet, which is composed of a movable portion inside magnet 6 and a movable portion outside magnet 7 each adjacent to a movable weight 5 and having a different magnetic pole, is fixed through a yoke 8 composed of a magnetic material. A set of the movable portion inside magnet 6, the movable portion outside magnet 7 and the yoke 8 is called a movable portion magnet 9 as a whole. Another multi-structural magnet whose different magnetic poles are disposed in confrontation with the movable portion magnet 9, respectively, in a stationary state is installed through a yoke 8 at a position confronting the aforementioned movable portion magnet 9. That is, when an installation base 18 is provided as a fixed portion and the movable portion inside magnet 6 has an N-pole, a fixed portion inside magnet 10 has an S-pole, the movable portion outside magnet 7 has an S-pole and a fixed portion outside magnet 11 has an N-pole.

Figures 28A, 28B:
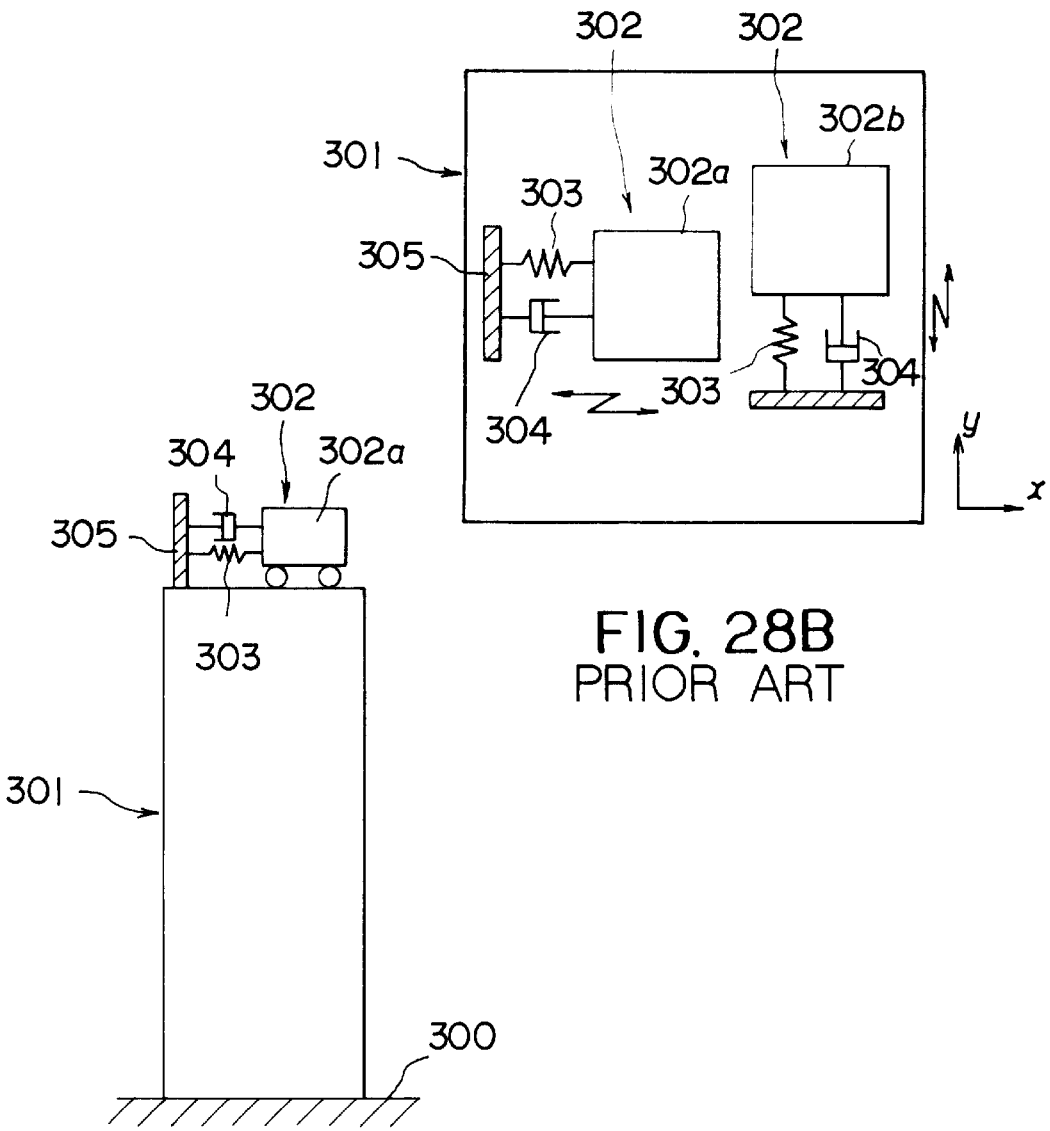
FIG. 28A is an illustrated elevation view showing a conventional example of the dynamic vibration absorber and FIG. 28B is an illustrated side elevational view showing the conventional example of the dynamic vibration absorber.

A set of the fixed portion inside magnet 10, the fixed portion outside magnet 11 and the yoke 8 is called a fixed portion magnet 12 as a whole. Although the movable portion magnet 9 and the fixed portion magnet 12 are installed in a vertical direction through a predetermined gap or interval 13 defined therebetween, the gap 13 is secured by a plurality of rigid balls 15 directly held through bearing receiving seats 14 fixed to the movable weight 5 and a structure (object 301 in FIG. 28) to be damped, respectively.

Further, a conductor plate 16 is installed in the gap 13 so as not to be in contact with the magnets. Although the conductor plate 16 may be fixed to any of an illuminating lamp pole 19 side or the movable weight 5 side, it is installed to an illuminating lamp pole 19 as the fixed portion side through a conductor plate support ring 17.

It is to be noted that although the double-cylindrical magnets are shown here as the multi-structural magnet, the magnets may be further installed to a multi-cylindrical shape. The dynamic vibration absorber using the magnetic spring/damper element arranged as described above is mounted at the top of the illuminating lamp pole 19 through the installation base 18 and entirely accommodated in an accommodating box 21 arranged integrally with lighting equipment 20. Further, although the installation base 18 is provided as the fixed portion in this embodiment, it is exemplified as a shape which can be easily fixed when an object to which the dynamic vibration absorber is installed is long and the diameter thereof is smaller than that of the dynamic vibration absorber as the illuminating lamp pole 19. Any portion may be used as the fixed portion so long as it can be fixed to a structure to damped, thus any shape suitable for fixing may be employed to a structure to be damped whose shape is different from that of the illuminating According to the above arrangement, when the movable weight 5 is moved from a stationary position, an attracting force acts between the different magnetic poles confronting at a stationary positions such as, for example, between the movable portion inside magnet 6 and the fixed portion inside magnet 10. On the other hand, a repelling force acts between the adjacent same magnetic poles, that is, when, for example, the N-pole of the fixed portion outside magnet 11 approaches the N-pole of the movable portion inside magnet 6. Although it is also apparent from FIG. 2, the movement from the stationary position can be executed in any arbitrary two-dimensional direction as well as a restoring force acts on the movement in any arbitrary direction.

Therefore, when an external force such as an earthquake or the like acts, the dynamic vibration absorber of the first embodiment can greatly reduce the vibration of the lighting equipment 20 by the vibration of the movable weight 5.

Next, a second embodiment according to the present invention will be described hereunder with reference to FIG. 3 and FIG. 4. The same numerals as used in FIG. 1 and FIG. 2 are used to denote the same arrangements in FIG. 3 and FIG. 4 and the description of the arrangements is omitted. In this embodiment, bearing receiving seats 14 are disposed in a gap 13 between a movable portion magnet 9 and a fixed portion magnet 12 which confront each other and rigid balls 15 are held between the bearing receiving seats 14. The bearing receiving seats 14 on a movable portion side and a fixed portion side are fixed to yokes 8 through bearing support rings 22. A conductor plate support ring 17 and the lower yoke 8 also serves as the fixed portion in the example.

In the dynamic vibration absorber of the second embodiment arranged as described above, since the bearing receiving seats 14 between which the rigid balls 15 are held is interposed in the gap 13 between the confronting movable portion magnet 9 and fixed portion magnet 12, the size of the absorber can be reduced as small as the external dimension of the confronting magnets.

Figure 5:
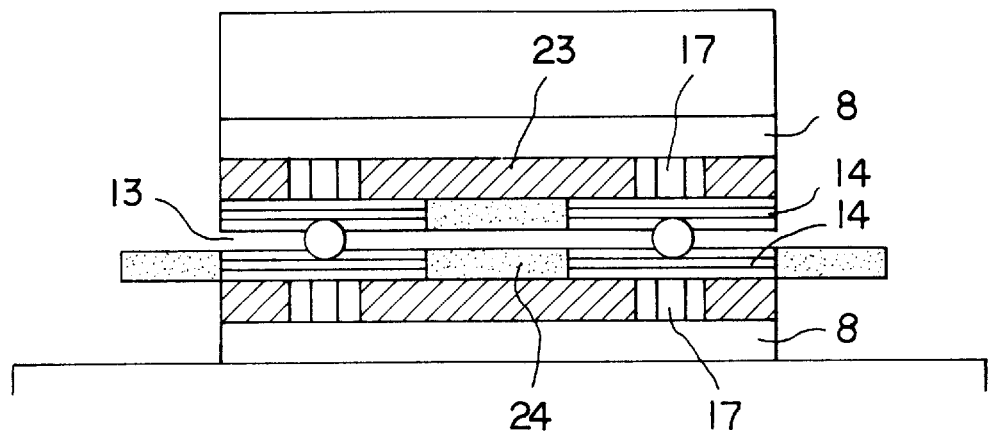
FIG. 5 is a longitudinal cross sectional view showing a third embodiment of the dynamic vibration absorber according to the present invention.

FIG. 5 shows a third embodiment according to the present invention, wherein a movable conductor plate 23 in which a bearing receiving seat 14 is embedded, and a fixed portion conductor plate 24 in which a bearing receiving seat 14 is embedded are fixed to yokes 8, respectively, through conductor plate support rings 17 and installed in the gap 13 located between the confronting movable portion magnet 9 and fixed portion magnet 12, and rigid balls 15 are held between the bearing receiving seats 14. Further, the lower yoke 8 also serves as the fixed portion in this embodiment.

The size of the dynamic vibration absorber arranged as described above can be reduced as small as the external dimension of the confronting magnets likewise the second embodiment.

Figure 6:
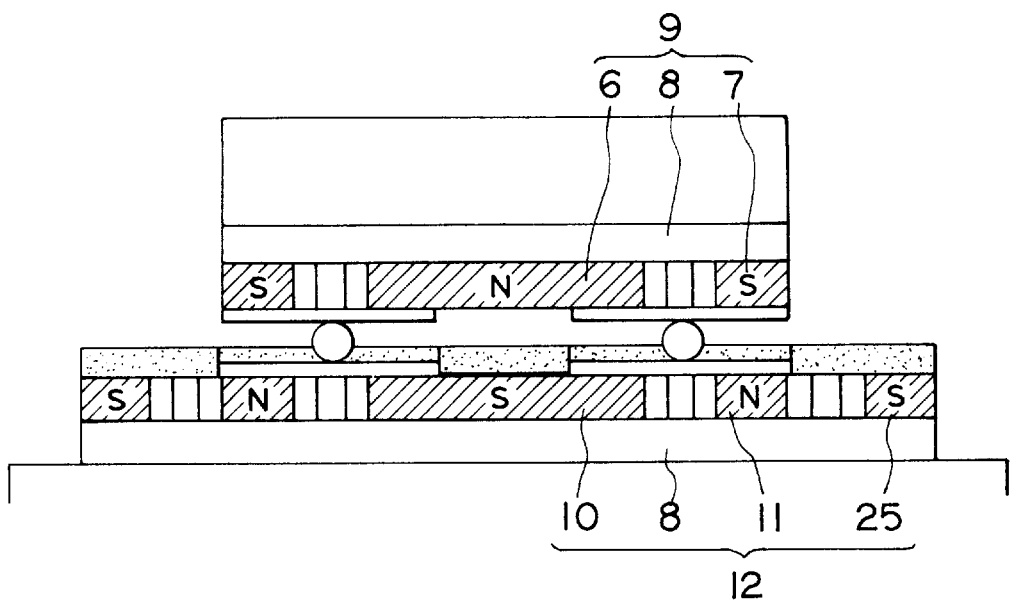
FIG. 6 is a longitudinal cross sectional view showing a fourth embodiment of the dynamic vibration absorber according to the present invention.

FIG. 6 shows a fourth embodiment according to the present invention, wherein a fixed portion magnet 12 is composed of a portion formed to a shape symmetrical with a movable portion magnet 9 and further an outermost peripheral magnet 25 disposed outwardly of the above portion through a yoke 8. The outermost peripheral magnet 25 has a magnetic pole which is different from that of a fixed portion outside magnet 11 and the same as that of a movable portion outside magnet 7.

In the embodiment arranged as described above, even if the movable portion magnet 9 is displaced by a large amount, a restoring force can be prevented from being lowered by the repulsion caused between the outermost peripheral magnet 25 and the movable portion outside magnet 7 each having the same magnetic pole by the addition of the outermost peripheral magnet 25 to the fixed portion magnet 12.

Figure 7:
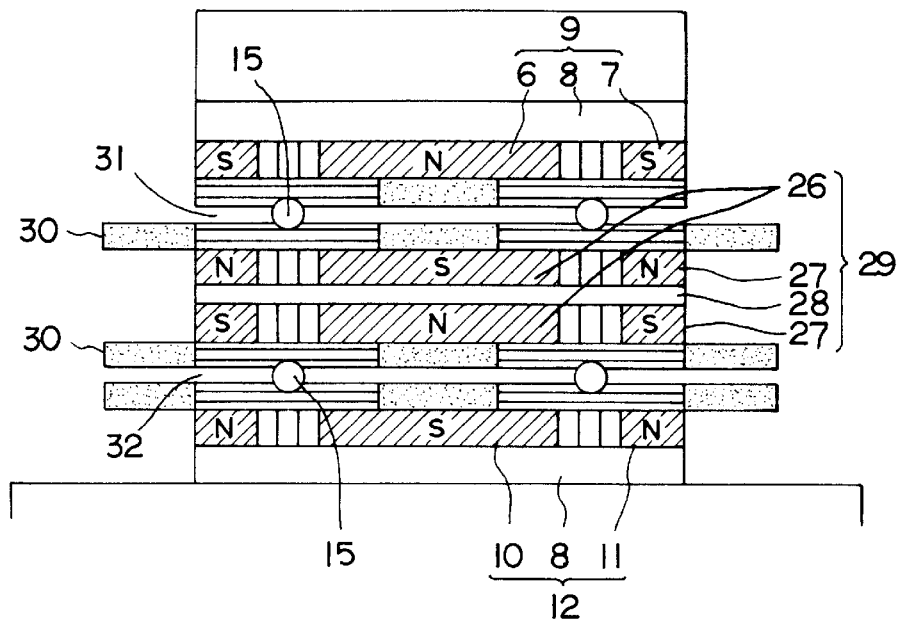
FIG. 7 is a longitudinal cross sectional view showing a fifth embodiment of the dynamic vibration absorber according to the present invention.

FIG. 7 shows a fifth embodiment according to the present invention, in which an intermediate portion magnet 29 is interposed between a movable portion magnet 9 and a fixed portion magnet 12, the intermediate portion magnet 29 being composed of a movable inside magnet 26 and a movable outside magnet 27 which have the same shapes as those of the movable portion magnet 9 and the fixed portion magnet 12 and are disposed on and under a yoke 28, so that these magnets are arranged to constitute a multi-layered structure. The intermediate portion magnet 29 secures a gap 31 and a gap 32 between the movable portion magnet 9 and the fixed portion magnet 12 by such an arrangement that intermediate portion conductor plates 30 each having a bearing receiving seat 14 embedded therein are fixed to an upper position and an a lower position and rigid balls 15 are held by the bearing receiving seats 14.

Further, the magnets of the intermediate portion magnet 29 disposed on the yoke confront the movable portion magnet 9 with the magnetic poles thereof different from those of the movable portion magnet 9, whereas the magnets of the intermediate portion magnet 29 under the yoke 28 confront the fixed portion magnet 12 with the magnetic poles thereof different from those of the fixed portion magnet 12, respectively. In FIG. 7, a movable portion inside magnet 6 has an N-pole and the upper movable inside magnet 26 confronting it has an S-pole. Further, a movable portion outside magnet 7 has an S-pole and the upper outside magnet 27 has an N-pole in confrontation with the S-pole.

In the embodiment arranged as described above, since the movable range of the dynamic vibration absorber can be expanded because the magnets are arranged as the multi-layered structure, a large amplitude can be damped.

Figure 8:
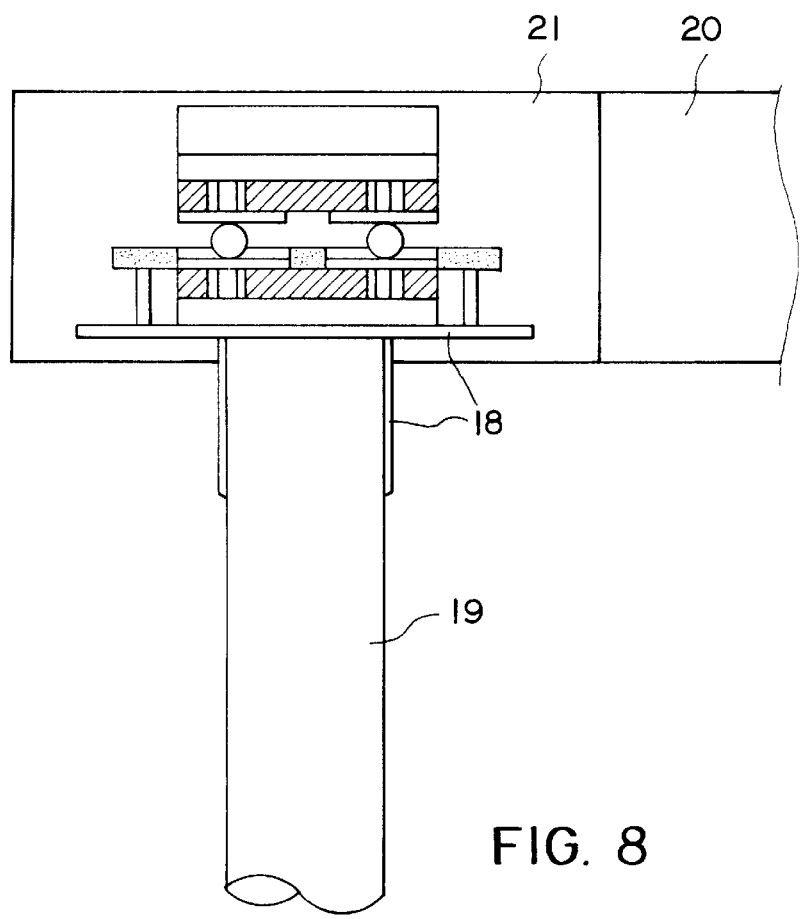
FIG. 8 is a longitudinal cross sectional view showing a sixth embodiment of the dynamic vibration absorber according to the present invention.

FIG. 8 shows a sixth embodiment according to the present invention. In this embodiment, a dynamic vibration absorber is installed in the vicinity of the top of a long columnar structure such as an illuminating lamp and road sign pole. In FIG. 7, the dynamic vibration absorber of the second embodiment shown in FIG. 3 is installed at the top of an illuminating lamp pole 19 through an installation truck 18.

It is needless to say that the dynamic vibration absorber shown as the embodiments other than the dynamic vibration absorber of the second embodiment may be installed thereto.

As described above, according to the first to sixth embodiments of the dynamic vibration absorber of the present invention, since the movable weight is supported by a magnetic restoring force with respect to any optionally two-dimensional direction, a damping effect can be obtained by the single movable weight regardless of a direction. Since the conductor plate interposed between the confronting magnets also serves as the magnetic damper and the spring element and the damping element can be entirely accommodated to the lower portion of the movable weight, the size of the dynamic vibration absorber can be greatly reduced. Further, the installation of the bearing portion between the confronting magnets and the multi-structured dynamic vibration absorber enables the further reduction of size of the damper in the radial direction thereof in addition to that the moving range of the movable portion is secured. Consequently, the vibration of a structure to be damped can be greatly reduced even if the structure has a low frequency and requires a large stroke to the movable portion and the reduction in size of the damper is required.

The present invention further provides an improved arrangement of the dynamic vibration absorber, which is an improved embodiment of the embodiment described above with reference to FIGS. 3 and 4.

Figure 3:
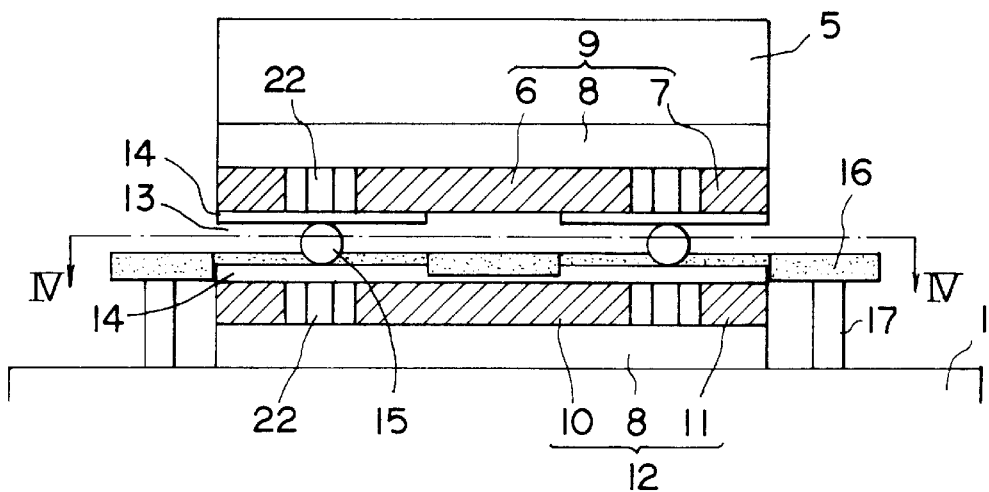
FIG. 3 is a longitudinal cross sectional view showing a second embodiment of the dynamic vibration absorber according to the present invention.
Figure 4:
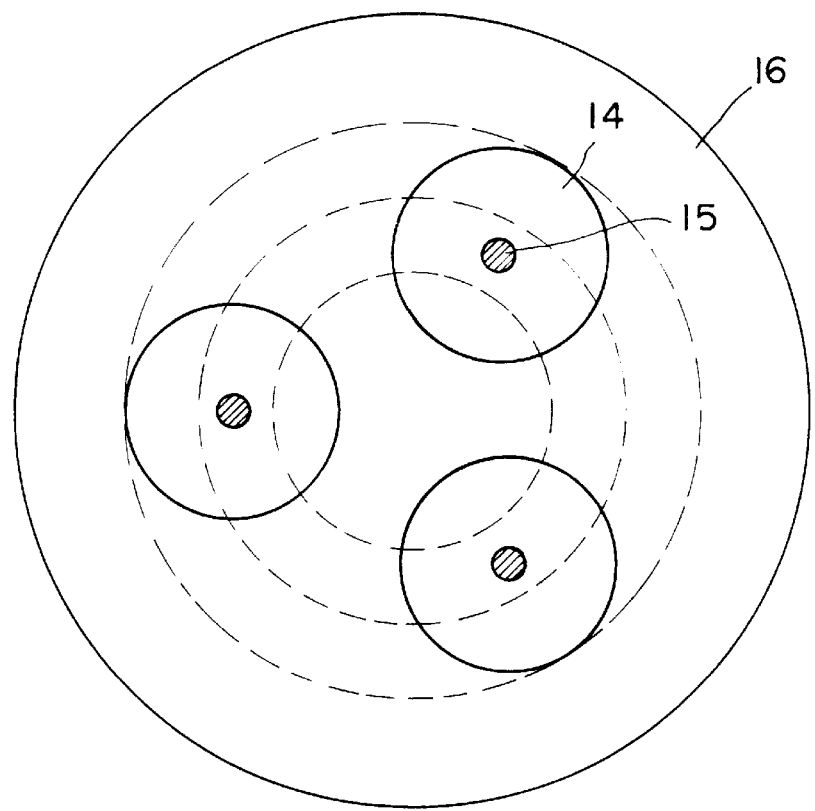
FIG. 4 is a cross sectional view taken along the line IV—IV in FIG. 3.

That is, according to the embodiment shown in FIGS. 3 and 4, since the plane receiving seats 14 are interposed between the fixed portion magnet 12 and the movable portion magnet 9 as shown in FIG. 3, the holes for the plane receiving seats 14 must be defined to the conductor plate 16. As a result, there may be caused a problem that the former absorber is difficult to be applied to an object to be damped which needs a large damping force.

Although it is contemplated to make the conductor plate 16 thick to secure the necessary volume of the conductor plate 16, since the gap 13 between the fixed portion magnet 12 and the fixed portion magnet 12 must be also widened, the size of the fixed portion magnet 12 and the movable portion magnet 9 must be increased to secure a magnetic force, thus the size of the dynamic vibration absorber being increased as a whole. However, there is a case where such a dynamic vibration absorber is not applicable to, for example, an illuminating lamp in which a space where the dynamic vibration absorber is installed is required to be reduced as much as possible.

Further, since the above dynamic vibration absorber is arranged only by holding the rigid balls 15 by the plane receiving seats 14, there is a possibility that the positional relationship between the rigid balls 15 and the plane receiving seats 14 is displaced by slip and the like. When the displacement is increased, a range where the rigid balls 15 can move without removing from the plane receiving seats 14 is narrowed. The movable range is also narrowed when the object to be damped is subjected to a twist force and the movable weight 5 and the movable portion magnet 9 are rotated, thus providing a problem of obtaining a sufficient damping force.

According to the present invention, there is provided a further embodiment in consideration of the above matters, which will be described hereunder with reference to FIGS. 9 to 18.

Figure 9A:
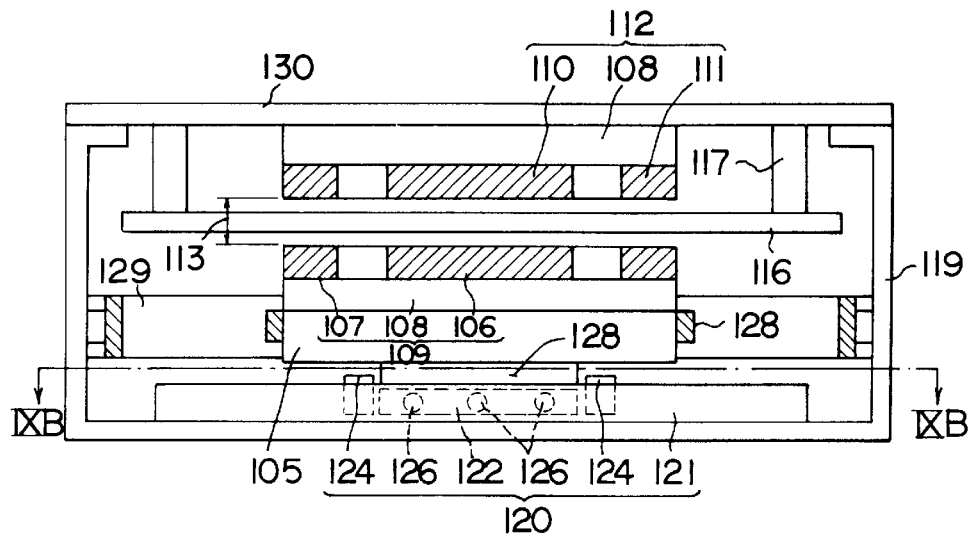
FIG. 9A is a longitudinal cross sectional view showing a seventh embodiment of the dynamic vibration absorber according to the present invention and FIG. 9B is a cross sectional view taken along the line IXB—IXB in FIG. 9A.
Figure 9B:
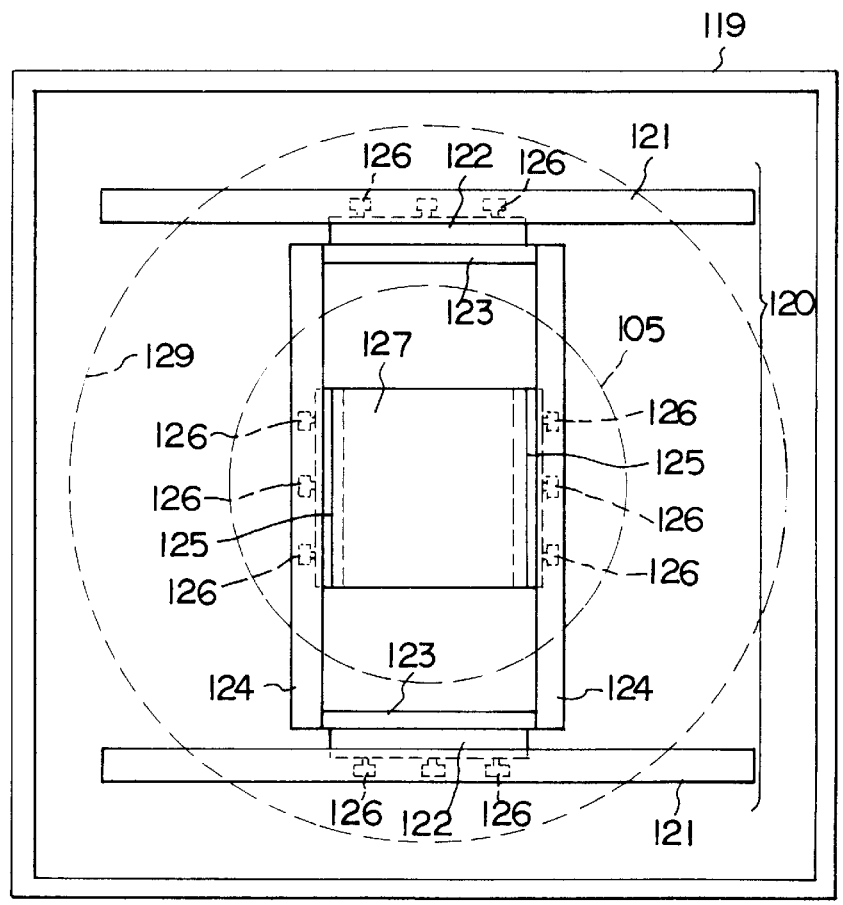

A seventh embodiment of the present invention will be described hereunder with reference to FIGS. 9A and 9B.

In the seventh embodiment, a multi-structural magnet including a movable portion inside magnet 106 and a movable portion outside magnet 107 arranged to have a different magnetic pole each other is fixed to a movable weight 105 through a yoke 108 composed of a magnetic material likewise the former example. Hereinafter, a set of the movable portion inside magnet 106, the movable portion outside magnet 107 and the yoke 108 is called a movable portion magnet 109.

A multi-structural magnet in which different magnetic poles are disposed in confrontation with each other at the stationary position of the movable portion magnet 106 is installed also at a position confronting the movable portion magnet 109 through a yoke 108. That is, when the movable portion inside magnet 106 has an N-pole, a fixed portion inside magnet 110 has an S-pole, the movable portion outside magnet 107 has an S-pole, and a fixed portion outside magnet 111 has an N-pole. Hereinafter, a set of the fixed portion inside magnet 110, the fixed portion outside magnet 111 and the yoke 108 is called a fixed portion magnet 112.

A fixing frame 119 is fixed to an object (301 in FIG. 28) to be damped, such as, for example, an illuminating lamp, not shown. A movable support table 120 as a movable support portion is fixed to the lower portion of the fixing frame 119. The movable support table 120 is composed of two fixed side rails 121 fixed to the fixing frame 119, fixed side sliders 122 linearly moving along the respective fixed side rails 121, two movable side rails 124 mounted between the fixed side sliders 122 through rail mounting portions 123, movable side sliders 125 linearly moving along the respective movable side rails 124 and a movable table 127 as a movable portion mounted between the movable side sliders 125. The respective sliders are moved by being guided by the respective rails through rollers 126.

The movable weight 105 is fixed to the movable table 127. The movable portion magnet 109 is fixed on the movable weight 105. A collision rubber 28 as a buffer material is attached around the cylindrical portion of the movable weight 105. A collision ring 129 is attached to the fixing frame 119 to restricting the movable range of the movable weight 105 and the movable portion magnet 109 by being collided against the collision rubber 28. Note, the position of the movable weight 105 and the position of the collision ring 129 are shown by dotted lines in FIG. 9B.

A fixing plate 130 is fixed on the fixing frame 119. The fixed portion magnet 112 is fixed to the fixing plate 130 through a predetermined gap 113 to the movable portion magnet 109. Further, a conductor plate 116 is fixed between the movable portion magnet 109 and the fixed portion magnet 112 through a conductor plate support ring 117.

In the dynamic vibration absorber having a magnetic spring type damper structure arranged as described above, the fixing frame 119 is fixed to an object to be damped such as, for example, an illuminating lamp. When an external force is applied to the object to be damped by an earthquake or the like, the force is also applied to the movable weight 105 and the movable portion magnet 109. Since the movable weight 105 and the movable portion magnet 109 are mounted to the lower portion of the fixing frame 119 through the movable support table 120 so as to be two-dimensionally movable, they move from the stationary positions thereof while keeping the gap 113 to the fixed portion magnet 112 constant. At this time, a restoring force resulting from a magnetic force between the movable portion magnet 109 and the fixed portion magnet 112 and a damping force resulting from the conductor plate 116 are produced to the movable weight 105 and the movable portion magnet 109. The restoring force and the damping force are adjusted to suppress a vibration by the natural frequency previously measured of the object to be damped and act likewise even if the external force is applied in any of two-dimensional directions. Therefore, the object to be damped on which the dynamic vibration absorber of the present invention is mounted can reduce a vibration in a two-dimensional direction.

When the movable weight 105 and the movable portion magnet 109 are moved, the movable support table 120 is moved by the fixed side sliders 122 and the movable side sliders 125 which are moved on the fixed side rails 121 and the movable side rails 124 perpendicular to each other through the rollers 126. With this operation, the movable support table 120 can be moved to any arbitrary position in the state that it supports the weight of the movable weight 105 and the movable portion magnet 109. Although the movable support table 120 is pulled upward by a magnetic attracting force between the fixed portion magnet 112 and the movable portion magnet 109 in the movement, since the movable weight 105 and the movable portion magnet 109 have a downward force, it suffices for the movable support table 20 only to support a relatively small force.

When a large force is applied to the movable weight 105 and the movable portion magnet 109, the collision ring 129 attached to the fixing frame 119 and the collision rubber 128 attached to the movable weight 105 limit the movable range of the movable weight 105 and the movable portion magnet 109 before the amount of movement thereof reaches the limited movable range of the movable support table 120. Accordingly, reliability can be improved because no large force is applied to the movable support table 120. Further, the maximum stroke of the movable weight 105 and the movable portion magnet 109 can be adjusted by arbitrarily changing the thickness of the collision rubber when necessary.

Although the double-cylinder-type magnet is shown as the multi-structural magnet in the above embodiment, magnets may be disposed to form a plurality of cylinders.

Further, although the fixed portion magnet 112 is mounted to the upper side and the movable portion magnet 109 is mounted to the lower side, when the movable support table 120 has a sufficient strength, a similar operation can be obtained even if the positions thereof are reversed.

The conductor plate 116 may be fixed to any of the object to be damped side and the movable weight 105 side or may be fixed to both the sides by being dispersed thereto. Further, the conductor plate 116 may be fixed to the fixed portion magnet 112 integrally therewith through an electric insulating material.

The movable weight 105 may be divided into some parts so that the weight thereof can be arbitrarily selected in accordance with the vibration of the object to be damped. Further, it is possible to cope with the frequency dependency of the natural frequency of the object to be damped by suitably selecting the shape and position of the movable weight 105.

Although the example in which the rollers 126 are used as the rails and sliders constituting the movable support table 120 is shown, straight guides such as linear guides, ball screws, linear splines may be used to constitute the movable support table 120.

The collision ring 129 may be directly attached to the object to be damped or the object to be damped itself may be used in place of the collision ring 129 by being molded to a suitable shape. Further, the fixing frame 119 molded to a cylindrical shape may be used in place of the collision ring 129.

A rubber material, a buffer material, a sheet spring, an air spring or the like may be used together with or in place of the collision ring 129.

When the movable weight 105 and the movable portion magnet 109 are moved in a small amount, the collision rubber 128 and the collision ring 129 may be omitted.

The absorber may be directly assembled to the object to be damped without providing the fixing frame 119. The number of the parts of the absorber can be reduced and the size and weight thereof can be reduced as a whole by such an arrangement that, for example, a cylindrical vessel portion is provided with an illuminating lamp case, the movable support table 120, the movable weight 105, and the movable portion magnet 109 are mounted on the bottom of the vessel portion and the fixed portion magnet 112 and the conductor plate 116 are mounted to the bottom of the upper lid of the illuminating lamp case. In this case, the inside surface of the cylindrical vessel portion may be used in place of the collision ring 129.

The dynamic vibration absorber may be mounted to a damper for upward and downward vibrations to obtain a damping effect in a three-dimensional direction.

As described above, according to the seventh embodiment of the present invention, the conductor plate 116 need not be cut out and the thickness thereof can be reduced. Further, the gap 113 can be narrowed as well as the size of respective magnets can be made relatively small.

Further, since there is no factor for narrowing the movable range of the movable weight 105 and the movable portion magnet 9, an absorber securely operating with high reliability can be arranged.

Further, since the movable range of the movable weight 105 and the movable portion magnet 109 is limited to a predetermined range by the collision ring 129 and the collision rubber 128, no large force is applied to the movable support table 120 and strength required thereto is reduced, whereby the size and the weight of the damper can be reduced.

Further, when the fixed portion magnet 112 is disposed to the upper side, the movable portion magnet 109 is disposed to the lower side and a load on the movable support table 120 is suppressed to a small amount, a large strength is not needed to the movable support table 120 and a resistance force such as the rolling frictional force of the rollers 126 resulting from the movement of the sliders on the respective rails can be reduced.

Therefore, the dynamic vibration absorber of the described embodiment can be arranged to have a small size and a light weight as well as can reduce the vibration of an object to be damped with high reliability when an external force such as an earthquake is applied.

Figure 10:
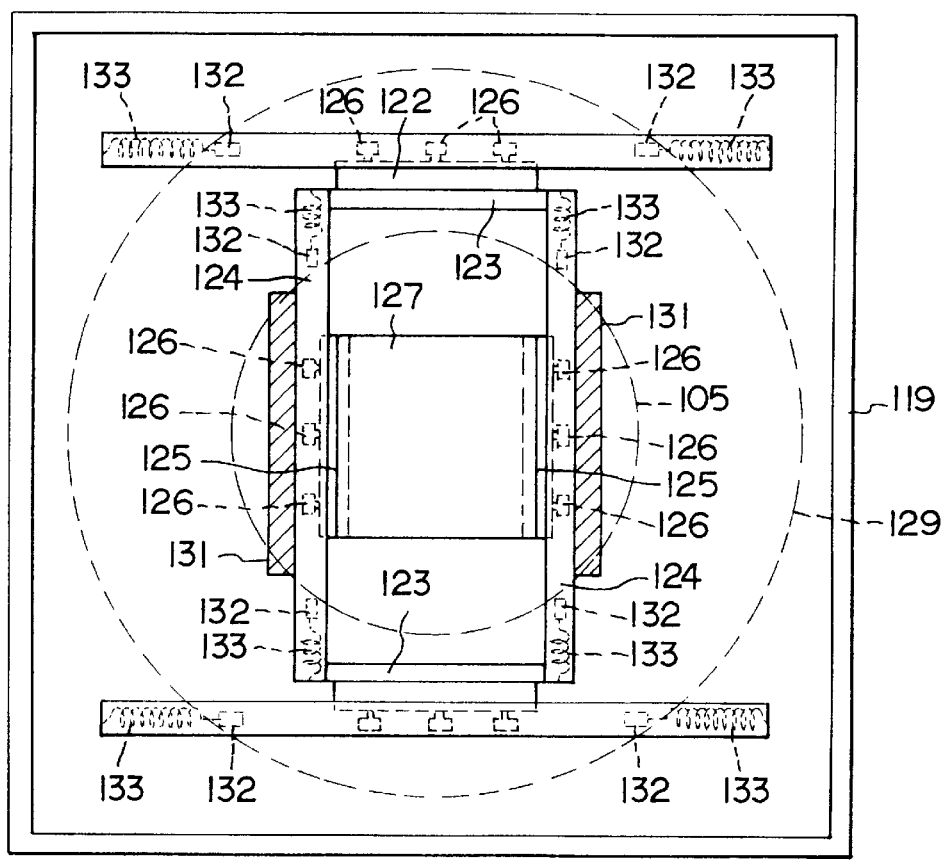
FIG. 10 is a plan view of a eighth embodiment of the dynamic vibration absorber according to the present invention.

Next, an eighth embodiment according to the present invention will be described hereunder with reference to FIG. 10. In FIG. 10, the fixing frame 119, fixed side rails 121, fixed side sliders 122, rollers 126, movable side rails 124, rail mounting portions 123, movable side sliders 125, and a movable table 127 are arranged similarly to those of the seventh embodiment and operate likewise them.

Additional weights added weight 131 are mounted to the movable side rails 124. Further, end sliders 132 and end springs 133 are mounted to both the ends of the fixed side rails 121 and the movable side rails 124 and move along the respective rails by being guided thereby.

The portions other than the above movable support table 120 are arranged likewise those of the seventh embodiment shown in FIG. 9.

Operation of the eighth embodiment arranged as described above will be described.

When the magnetic spring force and magnetic damping force of the dynamic vibration absorber of a magnetic spring type damper structure are adjusted, the additional weights 131 are mounted to the movable side rails 124 in accordance with the direction dependency of the natural frequency of an object to be damped. Although the weight of the additional weights 131, the movable side rails 124, the fixed side sliders 122, and the rail mounting portions 123 moves in the direction of the fixed rails 121, since it does not move in the direction of the movable side rails 124, the frequency to be damped can be changed in each direction. This permits to improve a damping performance by optimally selecting the directions in which the respective rails are mounted to the additional weights 131, a movable weight 105 and the object to be damped even if the natural frequency is somewhat different depending upon the direction of vibration as in the case of, for example, an illuminating lamp.

Next, when the sliders are moved to the vicinity of the ends of the respective rails by the movement of the movable weight 105 and the movable portion magnet 109 of the dynamic vibration absorber of the present invention, the fixed side sliders 122, for example, come into contact with the end sliders 32 and are further moved while pushing them. With this operation, the end springs 133 are displaced and a force for pushing and returning the fixed side sliders 122 is produced. Since the magnetic spring force between a fixed portion magnet 112 and the movable portion magnet 109 can be supplemented at the ends of the respective rails, the size of the respective magnets can be reduced.

The additional weights 131 may be mounted to the rail mounting portions 123 fixed to the movable side rails 124 integrally therewith or the fixed side sliders 122 and the additional weights 131 may be adjusted by replacing the rail mounting portions 123 and the fixed side sliders 122 themselves.

Further, a damping balance may be adjusted in more detail by suitably setting the positions where the additional weights 131 are mounted.

The end springs 133 at the respective rail ends may be composed of absorbers, or springs and dampers may be also used together as the end springs 133.

As described above, according to the eighth embodiment, there can be improved a damping performance to an object to be damped having some direction dependency in a natural frequency as in, for example, an illuminating lamp.

Furthermore, even if the magnetic spring force between the fixed portion magnet 112 and the movable portion magnet 109 is insufficient, since it can be supplemented, the size of the respective magnets can be reduced.

Figure 11:
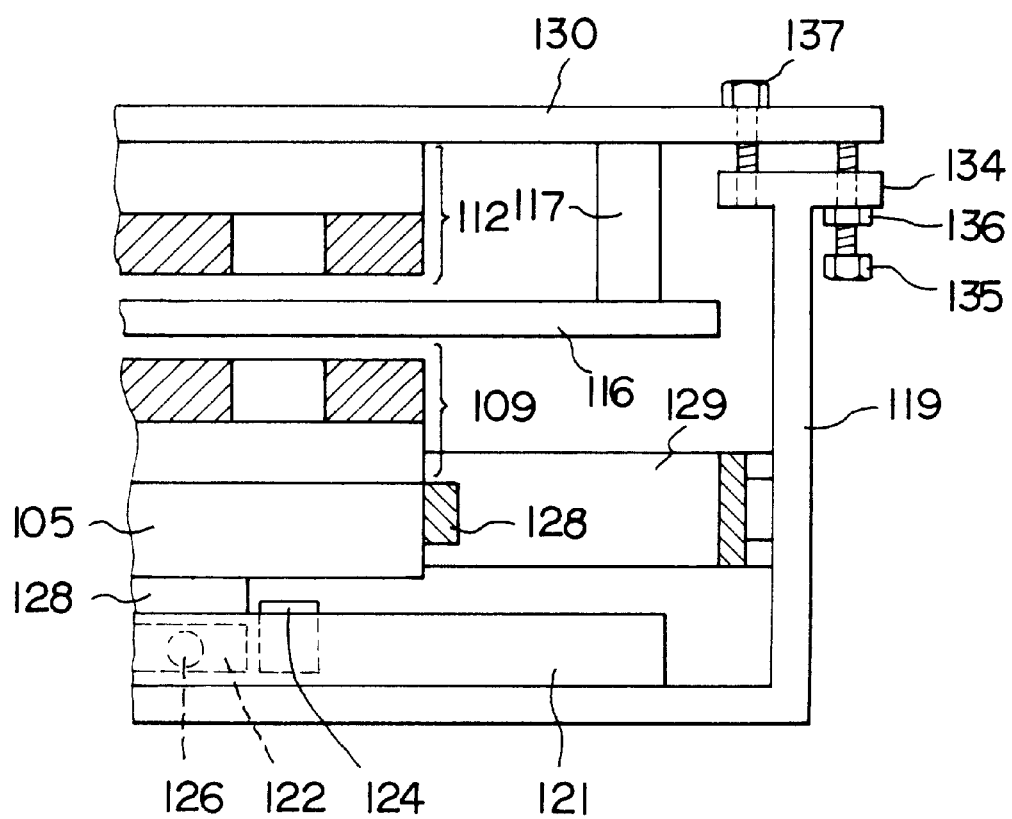
FIG. 11 is a longitudinal cross sectional view of a ninth embodiment of the dynamic vibration absorber according to the present invention.

A ninth embodiment the present invention will be described hereunder with reference to FIG. 11. In FIG. 11, a gap adjusting bolt 135 as an inter-magnet gap adjusting unit is mounted to the fixing plate mounting portion 134 at the upper portion of a fixing frame 119. The gap adjusting bolt 135 is fixed by a locking nut 136. A fixing plate 130 is mounted above the gap adjusting bolt 135. The fixing plate 130 is mounted to a fixing plate mounting portion 134 by a fixing bolt 137. The numbers of these gap adjusting bolt 135, locking nut 136 and fixing bolt 137 to be mounted are arbitrarily determined.

The portions other than the above are arranged likewise those of the seventh embodiment.

Operation of the ninth embodiment arranged as described above will be described hereunder.

When the magnetic spring force between a fixed portion magnet 112 and a movable portion magnet 109 is adjusted, all the fixing bolts 137 are removed and the locking nuts 136 are loosened to thereby adjust the gap adjusting bolts 135 to arbitrary positions. With this operation, the fixing plate 130, to which the fixed portion magnet 112 is fixed moves upward and downward, so that the gap 113 between the fixed portion magnet 112 and the movable portion magnet 109 can be adjusted. After the adjustment, the locking nuts 136 are tightened again to thereby fix the fixing plate 130 to the fixing plate mounting portion 134 by the fixing bolts 137.

With the above operation, since the gap 113 can be arbitrarily set, the magnetic spring force can be adjusted.

Furthermore, it is to be noted that there may be employed a method of adjusting the gap 113 between the fixed portion magnet 112 and the movable portion magnet 109 in accordance with the thickness of a spacer inserted between the fixing plate mounting portion 134 and the fixing plate 130.

The gap adjusting bolt 135, the fixing bolt 137 and the locking nut 136 as described above may be interposed between the yoke 108 of the fixing plate 130 and the fixed portion magnet 112.

As described above, according to the dynamic vibration absorber of the ninth embodiment, since the gap 113, that is, the magnetic attracting force and repelling force between the fixed portion magnet 112 and the movable portion magnet 109 can be adjusted, the magnetic spring force can be arbitrarily set in accordance with the natural frequency of an object to be damped. In addition, the secular change and the like of the natural frequency of the object to be damped can be coped with.

Next, a tenth embodiment according to the present invention will be described with reference to FIGS. 12A and 12B.

Figure 12A:
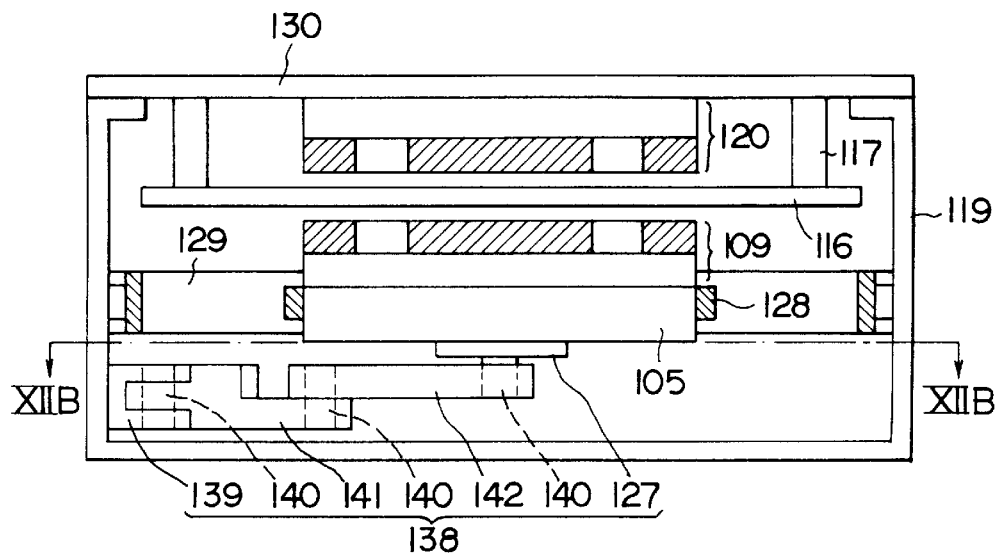
FIG. 12A is a longitudinal cross sectional view of a tenth embodiment of the dynamic vibration absorber according to the present invention and FIG. 12B is a cross sectional view taken along the line XIIB—XIIB in FIG. 12A.
Figure 12B:
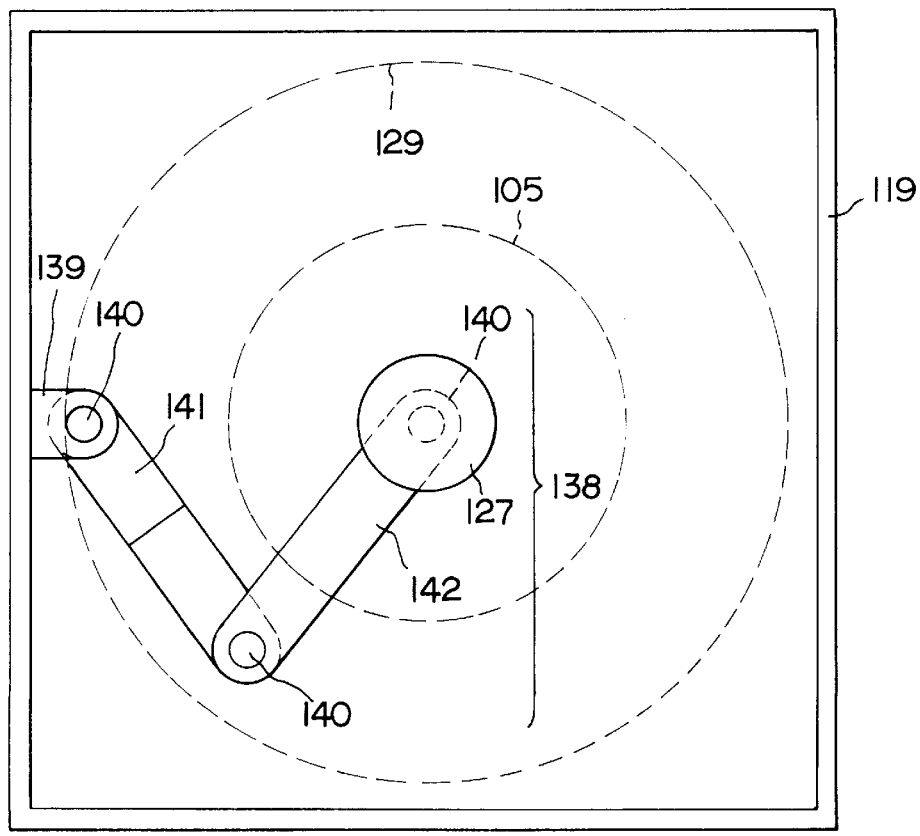

Referring to FIGS. 12A and 12B, a movable support arm 138 as a movable support portion is fixed to a fixing frame 119. The movable support arm 138 is composed of a rotation support portion 139 fixed to the fixing frame 119, a first arm member 141 horizontally rotatably mounted to the rotation support portion 139 through a rotary shaft 140, a second arm member 142 horizontally rotatably mounted to the first arm member 141 through the rotary shaft member 140, and a movable table 127 as a movable portion horizontally rotatably mounted to the extreme end of the second arm member 142 through the rotary shaft.

The portions other than the movable support arm 138 as the movable support portion are arranged likewise those of the seventh embodiment shown in FIG. 9.

Operation of the tenth embodiment arranged as described above will be described hereunder.

The movable support arm 138 is a horizontal arm which can move only in a horizontal direction and cannot move in a vertical direction and which can support a load such as the attracting force between a fixed portion magnet 112 and a movable portion magnet 109.

The movable weight 105 and the movable portion magnet 109 are mounted on the movable table 127 of the movable support arm 138. At this time, each arm member of the movable support arm 138 has such a length that it does not fully extend even if the movable weight 105 and the movable portion magnet 109 are located at the furthermost position from the rotation support portion 139. In addition, even if they approach the rotation support portion 139, each arm is in a positional relationship not to interfere with the fixed portion and the like.

When the movable weight 105 and the movable portion magnet 109 move, the movable support arm 138 permits the rotation support portion 139, the first arm member 141, the second arm member 142 to be rotated by the rotary shaft 140 while supporting the movable weight 105 and the movable portion magnet 109 in a vertical direction. With this operation, the movable weight 105 and the movable portion magnet 109 can be moved to any two-dimensional position while maintaining the gap 113 between the fixed portion magnet 112 and the movable portion magnet 109.

Note, although each one arm member is provided in the above embodiment, a parallel link type atm may be employed to increase a load resistance.

Further, a load on each arm member may be reduced by mounting a plurality of the movable support arms 138 in arbitrary directions.

As described above, according to the dynamic vibration absorber of the tenth embodiment, since the movable support portion can be arranged by the relatively small number of parts, reliability is improved.

Next, an eleventh embodiment of the present invention will be described hereunder with reference to FIG. 13.

Figure 13:
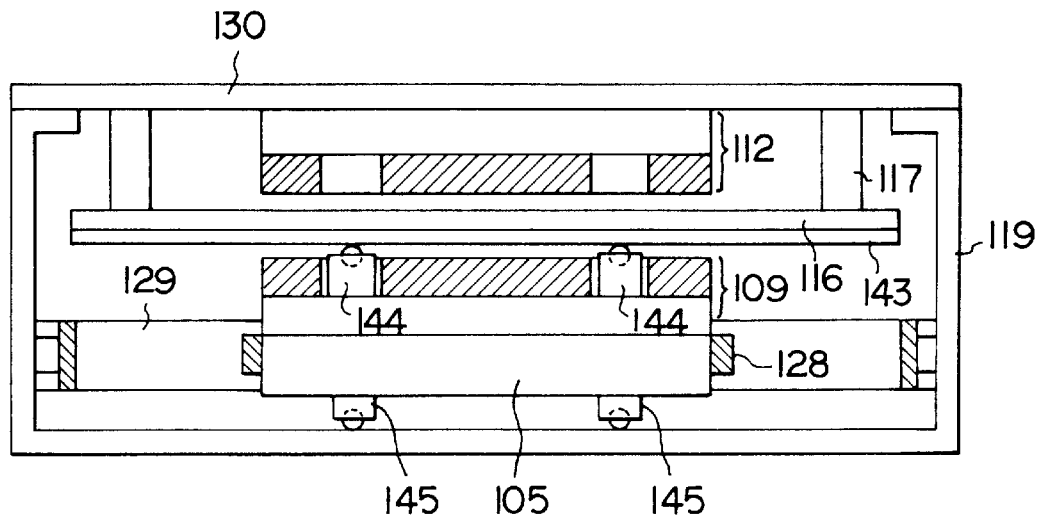
FIG. 13 is a longitudinal cross sectional view of an eleventh embodiment of the dynamic vibration absorber according to the present invention.

Referring to FIG. 13, a sliding plate 143 having a non-magnetic property and a wear resistance and made of, for example, ceramic is mounted under a conductor plate 116. Upper portion contact support rollers 144 as a movable support portion are mounted on the upper portion of a movable portion magnet 109. Further, lower portion contact support rollers 145 are mounted to the lower portion of a movable weight 105 through an arbitrary gap to the lower portion of a fixing frame 119. All of them are composed of a non-magnetic material such as stainless steel, ceramic or the like. The lower portion of the fixing frame 119 is made to provide a plane surface within the movable range of the movable weight 105 and the movable portion magnet 109.

The portions other than the above are arranged likewise those of the seventh embodiment shown in FIG. 9.

Operation of the eleventh embodiment arranged as described above will be described hereunder.

With reference to FIG. 13, when a force is applied to an object to be damped, the movable weight 105 and the movable portion magnet 109 roll and move on the surface of the sliding plate 143 while supporting the attracting force between the fixed portion magnet 112 and the movable portion magnet 109 by the upper portion contact support rollers 144. It is apparent that this movement can be made in any arbitrary two-dimensional direction.

Even if the movable weight 105 and the movable portion magnet 109 fall down by being subjected to a large downward force, they can be moved by being guided by the lower portion of the fixing frame 119 through the lower portion contact support rollers 145.

Further, there may be employed such a method that the sliding plate 143 and the upper contact support rollers 144 of the embodiment are made of a less expensive magnetic material for cost reduction and the magnetic force between the fixed portion magnet 112 and the movable portion magnet 109 is secured by increasing the size of each magnet.

Furthermore, there may be employed such a method that the lower portion contact support rollers 145 are omitted and the lower portion of the fixing frame 119 is mounted to the movable weight 105 through an arbitrary gap defined therebetween and the falling down of the movable weight 105 and the movable portion magnet 109 is coped with by the sliding between the bottom of the movable weight 105 and the fixing frame 119. At this time, the arbitrary number of contact support portions (rollers, spherical surfaces etc.) are mounted within the movable range of the movable weight 105 and the movable portion magnet 109 on the bottom of the fixing frame 119 to thereby reduce a frictional force resulting from sliding. Further, a sliding plate (oil containing metal plate, teflon plate, high graphite material etc.) may be mounted to the lower portion of the fixing frame 119 or the bottom of the movable weight 105 to thereby reduce the frictional force resulting from the sliding. A contact support portion (spherical surface etc.) of an arbitrary shape may be molded integrally with the lower portion of the fixing frame 119 or the bottom of the movable weight 105.

The sliding plate 143 may be mounted on the upper surface of the movable portion magnet 109, and the arbitrary number of contact support portions (rollers, spherical surfaces etc.) may be disposed on the lower surface of the conductor plate 116 within the movable range of the movable weight 105 and the movable portion magnet 109.

Although the fixed portion magnet 112 is mounted to the upper side and the movable portion magnet 109 is mounted to the lower side, when the upper portion contact support rollers 144 and the sliding plate 143 have a sufficient strength, a similar operation can be obtained even if the positions thereof are reversed.

The sliding plate 143 may be mounted to the fixing frame 119 and the conductor plate 116, and the fixed portion magnet 112 may be mounted to the upper portion of the sliding plate 143.

The conductor plate 116 may be mounted to the movable portion magnet 109. In addition, it may be mounted to the fixing plate 130 and the movable portion magnet 109 by being dispersed thereto.

The absorber may be directly assembled to an object to be damped without providing the fixing frame 119. The number of the parts of the absorber can be reduced and the size and weight thereof can be reduced as a whole by such an arrangement that, for example, a cylindrical vessel portion is provided with an illuminating lamp case, the fixed portion magnet 112, the conductor plate 116 and the sliding plate 143 are mounted on the bottom of the upper lid of the illuminating lamp case and the movable portion magnet 109 and the movable weight 105 are mounted on the lower portion of the vessel by the attracting force between the fixed portion magnet 112 and the movable portion magnet 109. In this case, the inside surface of the cylindrical vessel portion may be used in place of the collision ring 129.

As described above, according to the dynamic vibration absorber of the eleventh embodiment, since the holes required to be defined to the conductor plate in the former example are not needed, a sufficient magnetic damping force can be obtained even by a relatively thin conductor plate. The restriction of the movable range set in the former example is removed. Further, since the movable support portion can be realized by a relatively simple arrangement, the size of the damper can reduced and the reliability thereof can be improved.

Further, since a resistance force resulting from the movement of the movable weight 105 and the movable portion magnet 109 is reduced by the employment of the rollers each having a spherical body to the contact portion as the contact support portion, an excellent damping effect can be obtained even in the region of the object to be damped where it has a relatively small vibration, thus the performance of the damper being improved. Furthermore, since the movable range of the movable weight 105 and the movable portion magnet 109 is limited by the collision ring 129 attached to the fixing frame 119 and the collision rubber 128 attached to the movable weight 105, even if an unexpected force is applied to the object to be damped, the movable range can be limited to the range where a magnetic spring force acts, thus reliability being further improved.

A twelfth embodiment according to the present invention will be described hereunder with reference to FIG. 14.

Figure 14:
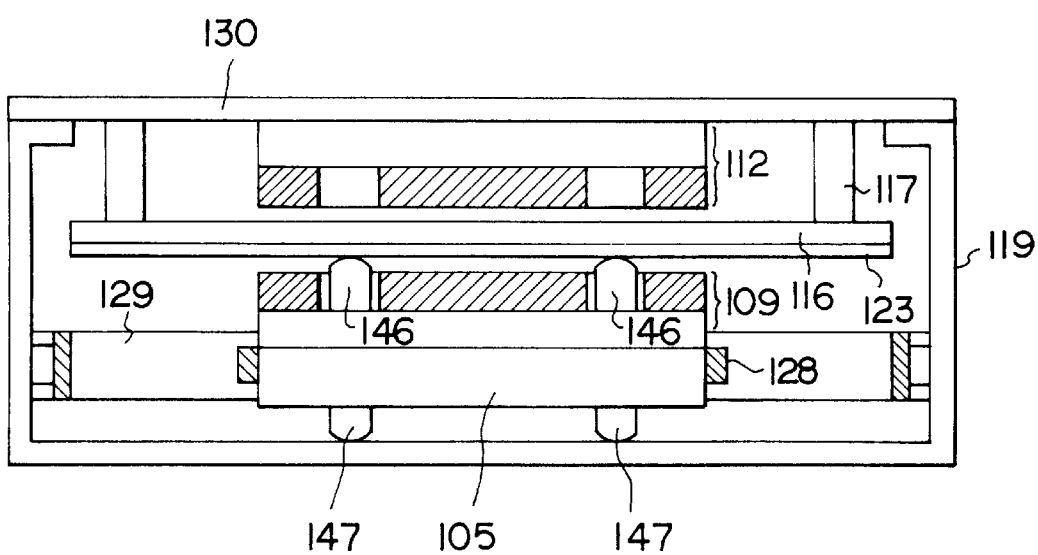
FIG. 14 is a longitudinal cross sectional view of a twelfth embodiment of the dynamic vibration absorber according to the present invention.

Referring to FIG. 14, a sliding plate 143 having a non-magnetic property and a wear resistance and made of, for example, ceramic is mounted under a conductor plate 116. Upper portion contact support members 146 as a movable support portion are mounted on the upper portion of a movable portion magnet 109. Further, lower portion contact support members 147 are mounted to the lower portion of a movable weight 105 through an arbitrary gap to the lower portion of a fixing frame 119. The sliding portions of the upper portion contact support members 146 and the lower portion contact support members 147 are molded to a plane or an arbitrary curved surface such as, for example, a spherical surface. The lower portion of the fixed frame 119 is formed to provide a plane surface within the movable range of the movable weight 105 and the movable portion magnet 109.

The portions other than the above are arranged likewise those of the seventh embodiment shown in FIG. 9.

Operation of the twelfth embodiment arranged as described above will be described hereunder.

In FIG. 14, when a force is applied to an object to be damped, the movable weight 105 and the movable portion magnet 109 slide and move on the surface of the sliding plate 143 while supporting the attracting force between the fixed portion magnet 112 and the movable portion magnet 109 by upper contact support members 144. It is apparent that this movement can be made in any arbitrary two-dimensional direction.

Even if the movable weight 105 and the movable portion magnet 109 fall down by being subjected to a large downward force, they can be moved by being guided by the lower portion of the fixing frame 119 through the lower portion contact support members 147.

The sliding plate 143, the upper portion contact support members 146 and the lower portion contact support members 147 may be composed of a sliding material (oil containing metal, teflon, high graphite material etc.).

Further, the lower portion contact support rollers 145 shown in FIG. 13 may be mounted in place of the lower portion contact support members.

As described above, according to the dynamic vibration absorber of the twelfth embodiment, the movable support portion can be simplified, thus reliability being further improved.

Next, a thirteenth embodiment according to the present invention will be described hereunder with reference to FIG. 15.

Figure 15:
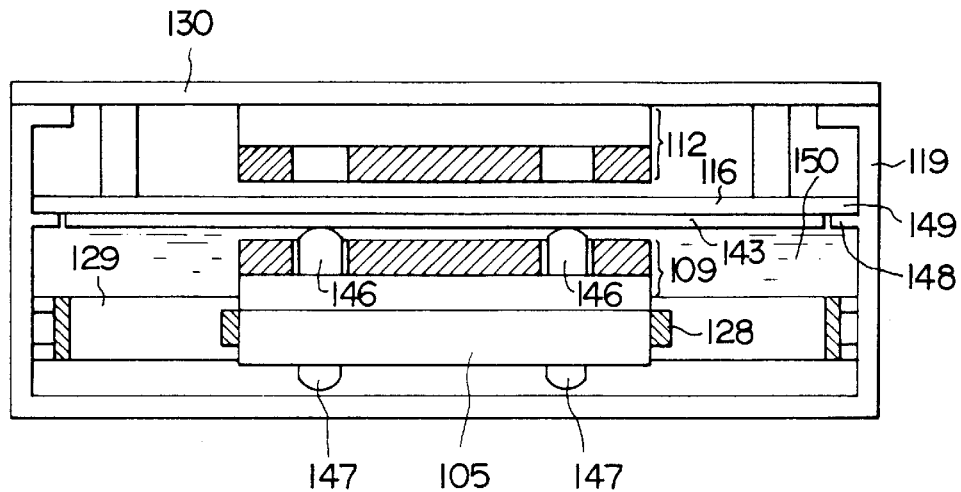
FIG. 15 is a longitudinal cross sectional view of a thirteenth embodiment of the dynamic vibration absorber according to the present invention.

Referring to FIG. 15, a fixing frame 119 is molded as a gas tight vessel. A conductor plate 116 is mounted to a conductor plate fixing portion 148 disposed to the fixing frame 119 through an O-ring 149. A space 150 below the conductor plate 116 is filled up with a lubrication oil 150.

A sliding plate 143 having a non-magnetic property and a wear resistance and made of, for example, ceramic is mounted under the conductor plate 116. Upper portion contact support members 146 as a movable support portion are mounted on the upper portion of a movable portion magnet 109. Further, lower portion contact support members 147 are mounted to the lower portion of a movable weight 105 through an arbitrary gap to the lower portion of the fixing frame 119. The sliding portions of the upper portion contact support members 146 and the lower portion contact support members 147 are molded to a plane or an arbitrary curved surface such as, for example, a spherical surface. The lower portion of the fixing frame 119 is made to a plane within the movable range of the movable weight 105 and the movable portion magnet 109.

The portions other than the above are arranged likewise those of the seventh embodiment shown in FIG. 9.

Operation of the seventh embodiment arranged as described above will be described hereunder.

In FIG. 15, when a force is applied to an object to be damped, the movable weight 105 and the movable portion magnet 109 slide and move on the surface of the sliding plate 143 while supporting the attracting force between a fixed portion magnet 112 and the movable portion magnet 109 by the upper portion contact support members 146. It is apparent that this movement can be made in any arbitrary two-dimensional direction. Further, the sliding plate 143 and the upper portion contact support members 146 can be lubricated well by the lubrication oil 150, a frictional force resulting from the movement of the movable weight 105 and the movable portion magnet 109 can be reduced. Further, since a viscosity resistance force resulting from the movement of the movable weight 105 and the movable portion magnet 109 in the lubrication oil can be used, the thickness of the conductor plate 116 can be reduced.

Even if the movable weight 105 and the movable portion magnet 109 fall down by being subjected to a large downward force, they can be moved by being guided by the lower portion of the fixing frame 119 through the lower portion contact support members 147.

In the above embodiment, the upper portion contact support members 146 and the lower portion contact support members 147 may be composed of the upper portion contact support rollers 144 and the lower portion contact support rollers 145 shown in FIG. 14.

Further, the number of parts may be reduced in such a manner that the lubrication oil 150 having a large viscosity is used, the conductor plate 116 is made unnecessary and only the sliding plate 143 is used. Otherwise, the conductor plate 116 may be omitted by the use of the sliding plate 143 composed of a conductive material.

The viscosity of the lubrication oil may be arbitrarily set by the provision of a heater, a temperature sensor and a controller for controlling the temperature of the lubrication oil.

An arbitrary irregular shape may be formed to the movable weight 105 to increase a viscosity resistance when the movable weight 105 and the movable portion magnet 109 move.

As described above, according to the dynamic vibration absorber of the thirteenth embodiment of the present invention, since the movable support portion can be simplified and the frictional resistance force caused when the movable weight 105 and the movable portion magnet 109 move can be made relatively small, reliability can be improved. Furthermore, since a viscosity force can be supplemented by the lubrication oil 150, the thickness of the conductor plate 116 can be reduced, thus the size of the damper being reduced.

A fourteenth embodiment according to the present invention will be described hereunder with reference to FIG. 16.

Figure 16:
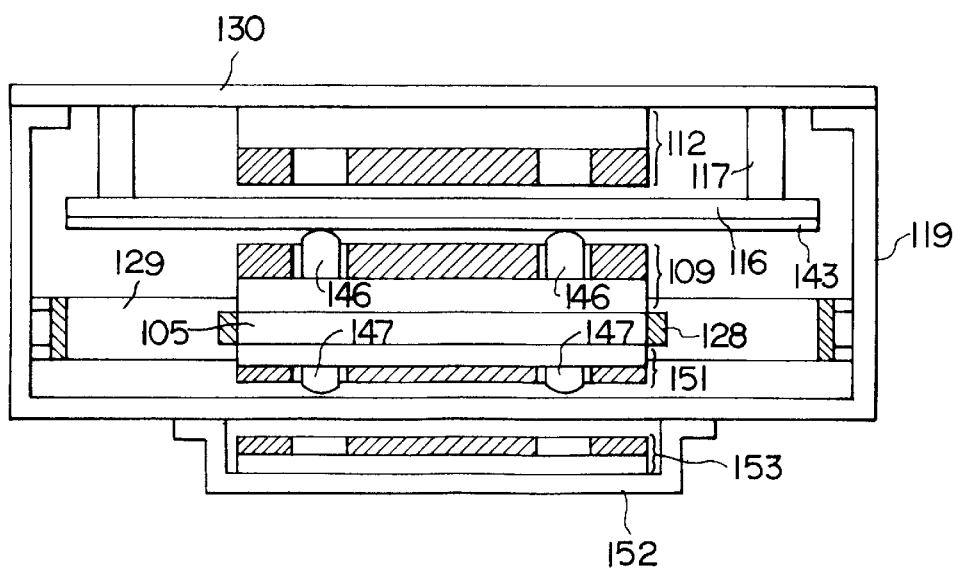
FIG. 16 is a longitudinal cross sectional view of a fourteenth embodiment of the dynamic vibration absorber according to the present invention.

Referring to FIG. 16, a fixing frame 119 is composed of stainless steel having a non-magnetic property and strength.

A sliding plate 143 having a non-magnetic property and a wear resistance and made of, for example, ceramic is mounted under a conductor plate 116. Upper portion contact support members 146 as a movable support portion are mounted on the upper portion of a movable portion magnet 109. Furthermore, lower portion contact support members 147 are mounted to the lower portion of a movable weight 105 through an arbitrary gap to the lower portion of the fixing frame 119. The sliding portions of the upper portion contact support members 146 and the lower portion contact support members 147 are molded to a plane or an arbitrary curved surface such as, for example, a spherical surface. The lower portion of the fixing frame 119 is made to a plane within the movable range of the movable weight 105 and the movable portion magnet 109.

A lower movable portion magnet 151 is fixed under a movable weight 105. A lower fixing portion magnet 153 is fixed to the lower portion of the fixing frame 119 through a lower portion fixing frame 152. The lower movable portion magnet 151 and the lower fixed portion magnet 153 are arranged likewise the movable portion magnet 109 and a fixed portion magnet 112.

The portions other than the above are arranged likewise those of the seventh embodiment shown in FIG. 9.

Operation of the fourteenth embodiment arranged as described above will be described hereunder.

In FIG. 16, when a force is applied to an object to be damped, the movable weight 105 and the movable portion magnet 109 slide and move on the surface of the lower portion of the sliding plate 143 or the fixing frame 119 while supporting the attracting force between the fixed portion magnet 112 and the movable portion magnet 109 or between the lower movable portion magnet 151 and the lower fixed portion magnet 153 by the upper portion contact support members 146 or the lower portion contact support members 147. It is apparent that this movement can be made in any arbitrary two-dimensional direction. At this time, the frictional force caused by the upper portion contact support members 146 or the lower portion contact support members 147 can be greatly reduced because the magnetic force between the fixed portion magnet 112 and the movable portion magnet 109 is approximately balanced with the weight of the movable weight 105, the movable portion magnet 109 and the lower movable portion magnet 151 and the magnetic force between the lower movable portion magnet 151 and the lower fixed portion magnet 153.

In the above embodiment, the upper portion contact support members 146 and lower portion contact support members 147 may be composed of the above upper portion contact support rollers 144 and the lower portion contact support rollers 145.

Further, the movable weight 105, the movable portion magnet 109 and the lower movable portion magnet 151 may move in a lubrication oil 150 as in the seventh embodiment.

A conductor plate 116 may be also mounted between the lower movable portion magnet 151 and the lower fixed portion magnet 153 to thereby increase a damping force.

As described above, according to the dynamic vibration absorber of the fourteenth embodiment, the frictional force produced to the upper portion contact support members 146 or the lower portion contact support members 147 can be greatly reduced. Thus, since an excellent damping effect can be obtained even if a relatively small vibration is applied to an object to be damped, a damping performance can be improved.

Furthermore, since the wear of each sliding portion resulting from the movement of the movable weight 105 and the movable portion magnet 109 can be effectively reduced, reliability can be improved.

Next, a fifteenth embodiment according to the present invention will be described hereunder with reference to FIGS. 17A and 17B.

Figure 17A:
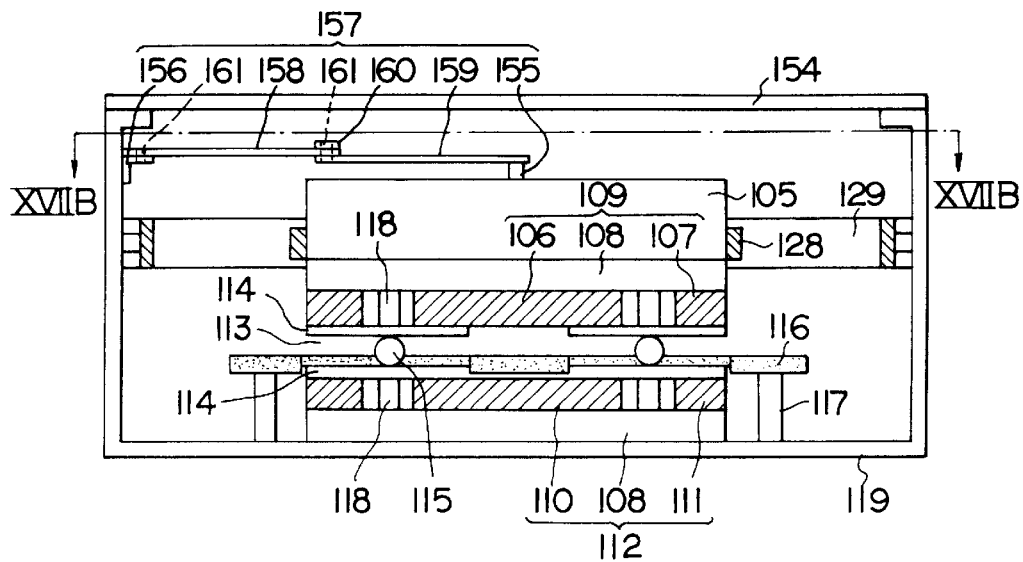
FIG. 17A is a longitudinal cross sectional view of a fifteenth embodiment of the dynamic vibration absorber according to the present invention and FIG. 17B is a cross sectional view taken along the line XVIIB—XVIIB in FIG. 17A.
Figure 17B:
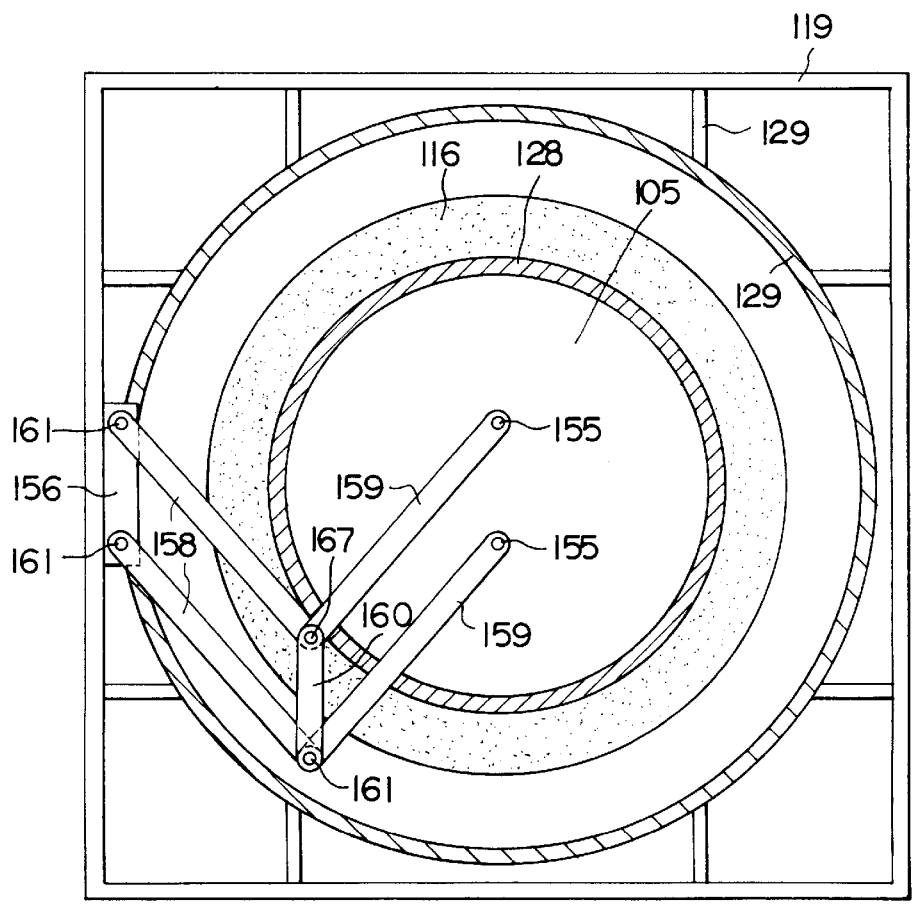

Referring to FIGS. 17A and 17B, an absorber with the arrangement shown in FIG. 3 is mounted under a fixing frame 119.

A collision rubber 128 is attached to a movable weight 105. A collision ring 129 is attached to the fixing frame 119. A cover 154 is attached to the upper portion of the fixing frame 119.

A parallel link mechanism 157 is mounted between the upper portion of the movable weight 105 and the fixing frame 119 through rotation fulcrums 155 and a link mounting portion 156. The parallel link mechanism 157 is composed of two first links 158 having the same length, two second links 159 having the same length and a connecting link 160 having the length between rotation support centers equal to the distance between rotation support centers of the respective links in the link mounting portion 156, these links being connected by rotation pins 161 and 167 so as to be rotatable in a horizontal direction. Further, the rotation fulcrums 155 also have the same interval as the length of rotation support centers of the respective links in the link mounting portion 156.

Operation of the fifteenth embodiment arranged as described above will be described hereunder.

When the movable weight 105 and the movable portion magnet 109 move to an arbitrary position in the movable range limited by the collision ring 129 and the collision rubber 128, the two first links 158 and the two second links 159 of the parallel link mechanism 157 are in parallel with each other at all times, respectively, and the line connecting the two rotation support centers of the link mounting portion 156, the connecting link 160 and the line connecting the rotation support centers of the two rotation fulcrums 155 are also in parallel with each other. With this arrangement, the degree of freedom of the rotational direction of the movable weight 105 and the movable portion magnet 109 can be restricted. As apparent from FIG. 17B, this rotation preventing mechanism is effective to the movement of the movable weight 105 and the movable portion magnet 109 in an arbitrary two-dimensional direction.

In the above embodiment, a bearing may be used as each rotation pin 161 to reduce a frictional force in rotation.

As described above, according to the dynamic vibration absorber of the fifteenth embodiment, since the movable range is not limited by the rotation of the movable weight 105 and the movable portion magnet 109, reliability is improved.

A sixteenth embodiment according to the present invention will be described hereunder with reference to FIGS. 18A and 18B.

Figure 18A:
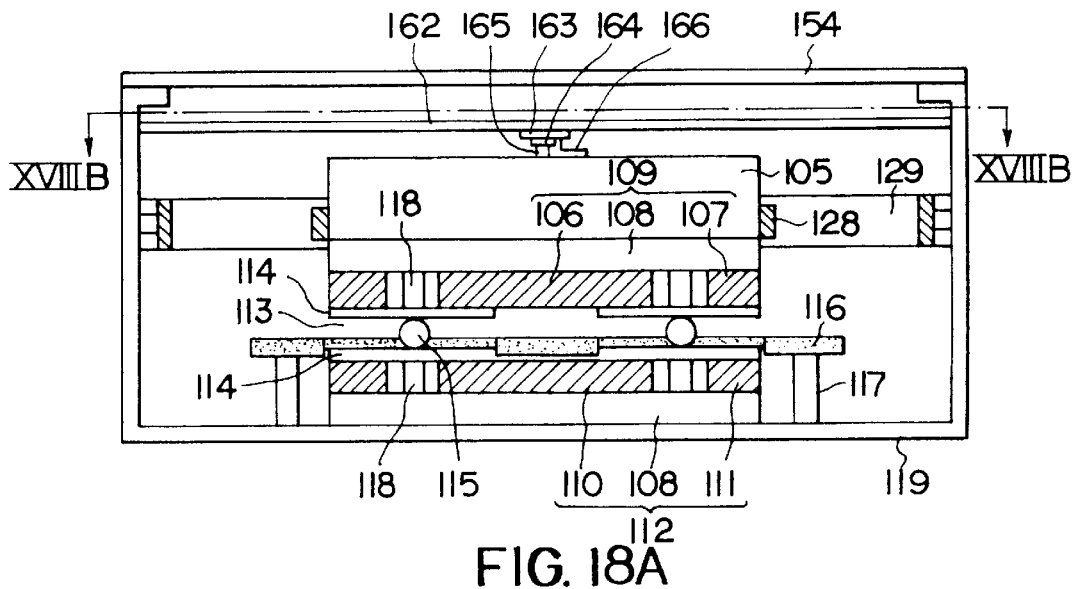
FIG. 18A is a longitudinal cross sectional view of a sixteenth embodiment of the dynamic vibration absorber according to the present invention and FIG. 18B is a cross sectional view taken along the line XVIIIB—XVIIIB in FIG. 18A.
Figure 18B:
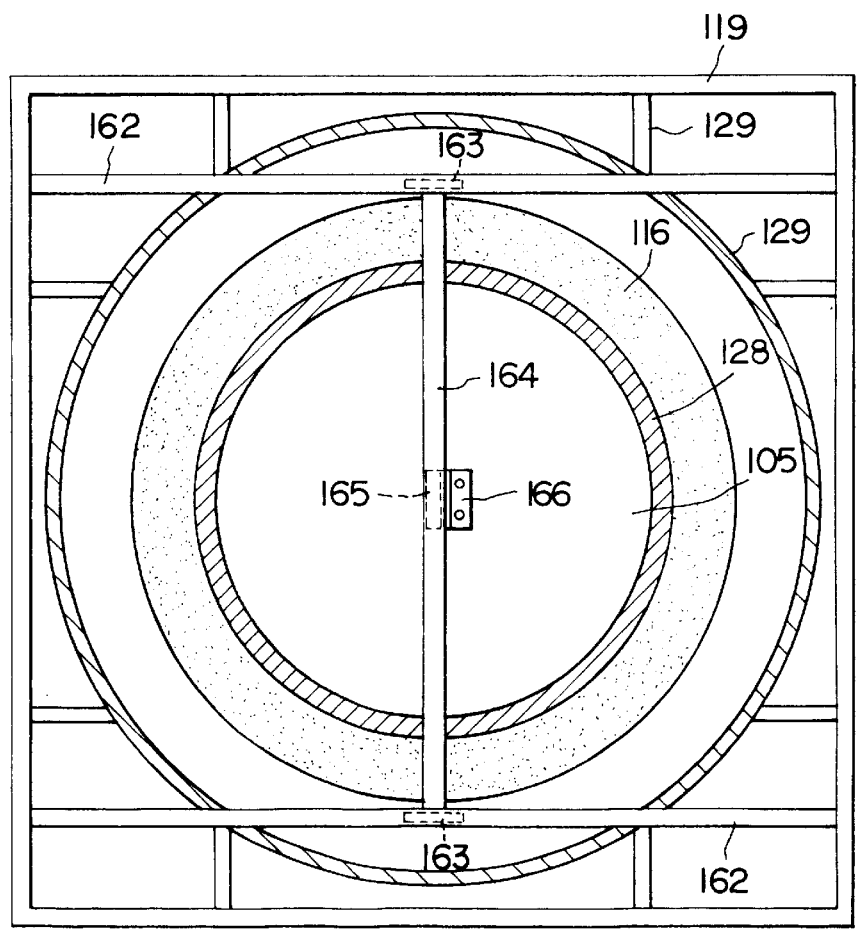

Referring to FIGS. 18A and 18B, an absorber with the arrangement shown in FIG. 3 is mounted under a fixing frame 119.

A collision rubber 128 is attached to a movable weight 105. A collision ring 129 is attached to the fixing frame 119. A cover 154 is attached to the upper portion of the fixing frame 119.

Two first rails 162 are mounted to the fixing frame 119. A linearly movable first slider 163 is mounted to each of the first rails 162. A second rail 164 is mounted to the first sliders 163. A linearly movable second slider 165 is mounted to the second rail 164. The second slider 165 is fixed to the upper portion of the movable weight 105 through a slider mounting portion 166.

Operation of the sixteenth embodiment arranged as described above will be described hereunder.

When the movable weight 105 and the movable portion magnet 109 move to an arbitrary position in the movable range limited by a collision ring 129 and a collision rubber 128, the first sliders 163 and the second slider 165 are moved linearly by being guided by the first rails 162 and the second rail 164, respectively. With this operation, it is possible to restrict the degree of freedom of the rotational direction of the movable weight 105 and the movable portion magnet 109 fixed to the second slider 165. As apparent from FIG. 18B, this rotation preventing mechanism is effective to the movement of the movable weight 105 and the movable portion magnet 109 in an arbitrary two-dimensional direction.

In the sixteenth embodiment, a plurality of the second rails 164 may be employed to increase the stability of movement.

Further, an additional may be mounted to the second rail 164 to thereby permit the adjustment to the direction dependency of the natural frequency of an object to be damped.

As described above, according to the dynamic vibration absorber of the sixteenth embodiment, since the movable range is not limited by the rotation of the movable weight 105 and the movable portion magnet 109, reliability is further improved.

As described above, according to the seventh to sixteenth embodiments of the dynamic vibration absorbers of the present invention, the movable weight is supported in any arbitrary two-dimensional direction by a magnetic restoring force and a damping effect is obtained by the single movable weight regardless of a direction. Since a function as a magnetic damper is added to the absorber by the provision of the conductor plate between the confronting magnets, the size of the absorber can be made relatively small as a two-dimensional absorber having a spring element and a damping element. Since the conductor plate need not be cut out due to such an arrangement that no movable support portion is interposed between the fixed portion magnet and the movable portion magnet, a large magnetic damping effect can be easily obtained as well as the movable range is not limited by the slip between the rigid balls and the plane receiving seat and the rotation of the movable weight. Furthermore, even if the rigid balls and the surface receiving seat are used, the restriction of the movable range due to the rotation of the movable weight and the movable magnet is avoided by the provision of the locking mechanism of the movable weight.

As described above, there can be provided the small and light dynamic vibration absorber having a magnetic spring type damper structure capable of reducing the two-dimensional vibration of an object to be damped with high reliability.

According to the present invention, there are further provided the following preferred embodiments of dynamic vibration absorbers.

Figure 19:
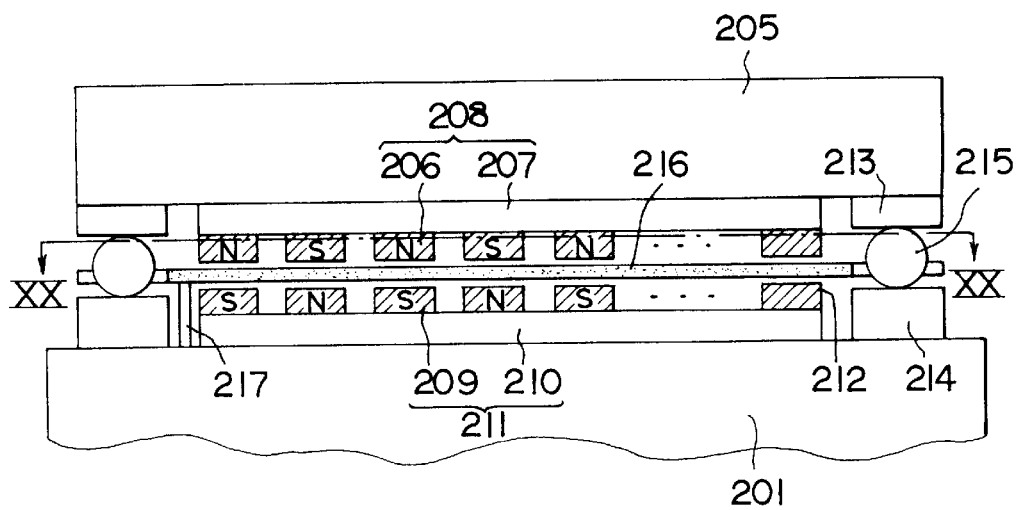
FIG. 19 is a longitudinal cross sectional view showing a seventeenth embodiment of a dynamic vibration absorber according to the present invention.
Figure 20:
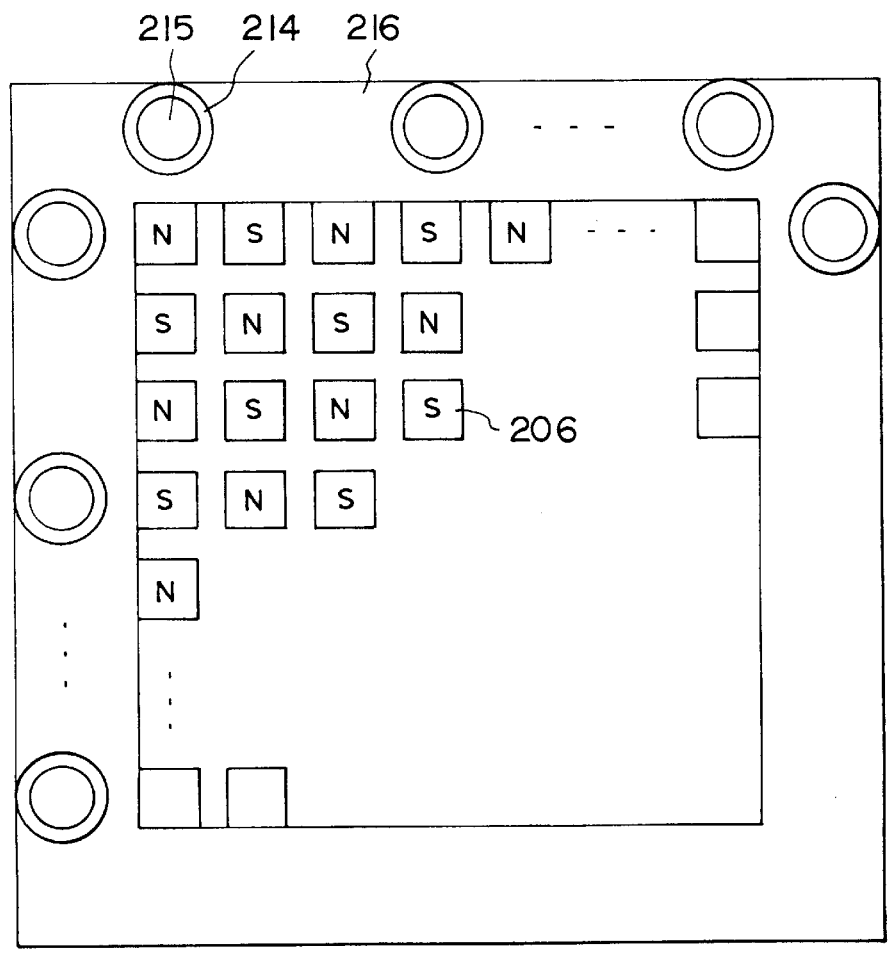
FIG. 20 is an illustrated cross sectional view taken along the line XX—XX in FIG. 19.

A seventeenth embodiment of a dynamic vibration absorber according to the present invention will be described hereunder with reference to FIG. 19 and FIG. 20.

In this seventeenth embodiment, a multiplicity of movable portion rectangular magnets 206 each magnetized in a thickness direction are longitudinally and laterally disposed on a horizontal surface of the movable weight 205 of the dynamic vibration absorber with a predetermined distance from respective rectangular magnets adjacent thereto on the four sides thereof so that the adjacent magnets have a different pole each other, and these magnets 206 are fixed through a back yoke 207, called merely yoke hereinafter.

The multiplicity of disposed movable portion rectangular magnets 206 and the yoke 207 are called a movable portion magnet train 208 as a whole. A multiplicity of fixed portion rectangular magnets 209 having the same shape and disposition as those of the movable portion magnet train 208 are also disposed to an object to be damped confronting the movable portion magnet train 208. The fixed portion rectangular magnets 209 are arranged to have poles different from those of the confronting movable portion rectangular magnets 206 in a stationary state and installed through a back yoke 10, called merely yoke hereinafter.

Further, the multiplicity of thus disposed fixed portion rectangular magnets 209 and the yoke 210 are called a fixed portion magnet train 211 as a whole. Although the movable portion magnet train 208 and the fixed portion magnet train 211 are installed while maintaining a predetermined vertical gap 212 therebetween, the gap 212 is secured by a plurality of steel balls 215 directly held between the movable weight 205 and the object to be damped through receiving seats 213 and 214 fixed thereto, respectively.

Further, a conductor plate 216 is installed to the gap 212 so as not to be in contact with the magnets. The conductor plate 216 is fixed to any of the object to be damped and the movable weight 205 through a support leg 217.

In the seventeenth embodiment arranged as described above, when the movable weight 205 is moved from the stationary position, that is, the movable portion rectangular magnets 206 are horizontally dislocated from the fixed portion rectangular magnet 209 confronting them, an attracting force acts because they have different poles from each other, whereas a repelling force acts when the same adjacent magnetic poles approach each other. These forces act as a restoring force for returning the amount of movement of the movable weight 205 to its original value with respect to the movement of the weight in any two-dimensional direction. Further, magnetic flux passing through the conductor plate 216 installed in the gap 212 between the confronting magnets effects a relative motion with respect to the conductor plate 216 as the movable weight 205 moves and the relative motion acts as a magnetic damping force caused by an eddy current loss produced to the conductor plate 216. Since an action as a magnetic spring and a magnetic damper is achieved by the above operation, the vibration of the object 201 to be damped can be reduced by the movable weight 205 mounted to the object to be damped. In particular, since the multiplicity of magnets divided into the small rectangular magnets or circular magnets are disposed, the amount of area dislocated between the movable portion rectangular magnets 206 and the fixed portion rectangular magnets 209 is increased with respect to the movement of the movable magnets 205 as compared with that of a large magnet having the same confronting area, whereby a large magnetic restoring force can be obtained. Therefore, since the quantity of magnets for obtaining a magnetic spring constant necessary to the dynamic vibration absorber can be reduced, the size of the dynamic vibration absorber can be further reduced.

Next, an eighteenth embodiment of the dynamic vibration absorber according to the present invention will be described hereunder with reference to FIG. 21.

This embodiment has an arrangement in which a multiplicity of movable portion circular magnets 218 and fixed portion circular magnets 219 are longitudinally and laterally disposed on a horizontal surface with a predetermined gap maintained therebetween so that adjacent magnets have a different magnetic pole and the movable portion circular magnets 218 and the fixed portion circular magnets 219 located at confronting positions in a stationary state have a different magnetic pole, in place of the rectangular magnets constituting the movable portion magnet train 208 and the fixed portion magnet train 211 of the seventeenth embodiment.

Since each magnet is formed to the circular shape in this embodiment arranged as described above, the same magnetic spring constant can be obtained in any arbitrary two-dimensional direction. Thus, this embodiment is particularly effective to suppress the rotational vibration of, for example, a rotor.

Figure 22:
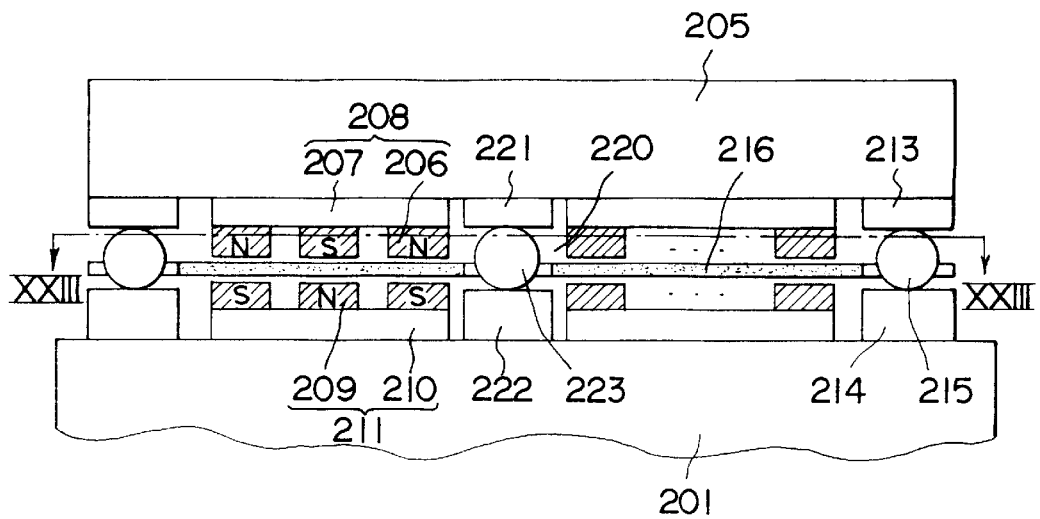
FIG. 22 is a longitudinal cross sectional view showing a nineteenth embodiment of the dynamic vibration absorber according to the present invention.
Figure 23:
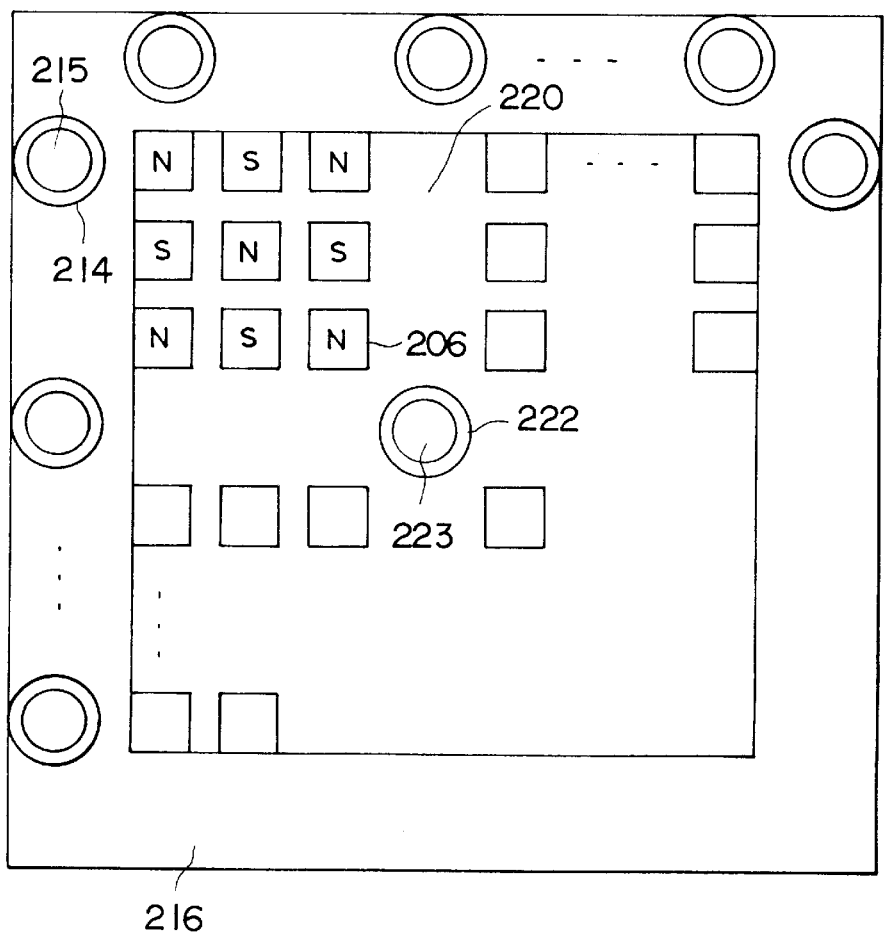
FIG. 23 is an illustrated cross sectional view taken along the line XXIII—XXIII in FIG. 22.

A nineteenth embodiment of the dynamic vibration absorber according to the present invention will be further described hereunder with reference to FIGS. 22 and 23. In this embodiment, an intermediate space 220 is formed by widening the gaps between adjacent magnets at the same intermediate positions where the multiplicity of rectangular magnets or circular magnets constituting the movable portion magnet train 208 and the fixed portion magnet train 211 of the seventeenth embodiment are disposed so as to divide the movable portion magnet train 208 and the fixed portion magnet train 211, intermediate receiving seats 221 and 222 are mounted to a movable weight 205 and an object 201 to be damped in the space and rigid balls 223 are held therebetween.

According to this embodiment of the arrangement described above, when the cross sectional area of the movable portion magnet train 208 is increased by the particular increase of the number of the disposed magnets, since a support portion is provided vertically also at the intermediate position, the deformation of an external surface including the movable weight 205 can be prevented as a whole. Therefore, the gap between the confronting magnets can be maintained uniform over the entire surfaces thereof as well as the movable weight 205 can be moved horizontally without any resistance by the rolling of the rigid balls 223.

Next, a twentieth embodiment of the dynamic vibration absorber according to the present invention will be described hereunder with reference to FIG. 24.

This embodiment has an arrangement in which, in the movable portion magnet train 208 and the fixed portion magnet train 211 of the seventeenth embodiment, the number of the movable portion rectangular magnets 206 and the fixed portion rectangular magnets 209 disposed longitudinally on the horizontal surface is made different from the number of them disposed laterally.

In this embodiment, the dislocated area of the movable portion rectangular magnets 206 and the fixed portion rectangular magnets 209 resulting from the movement of the movable weight 205 can be optionally adjusted with respect to the horizontal two directions parallel with the sides of the rectangular magnets. Therefore, when an object 201 to be damped has a different frequency in two directions, a damping effect can be exhibited in accordance with the different frequency.

Figure 24:
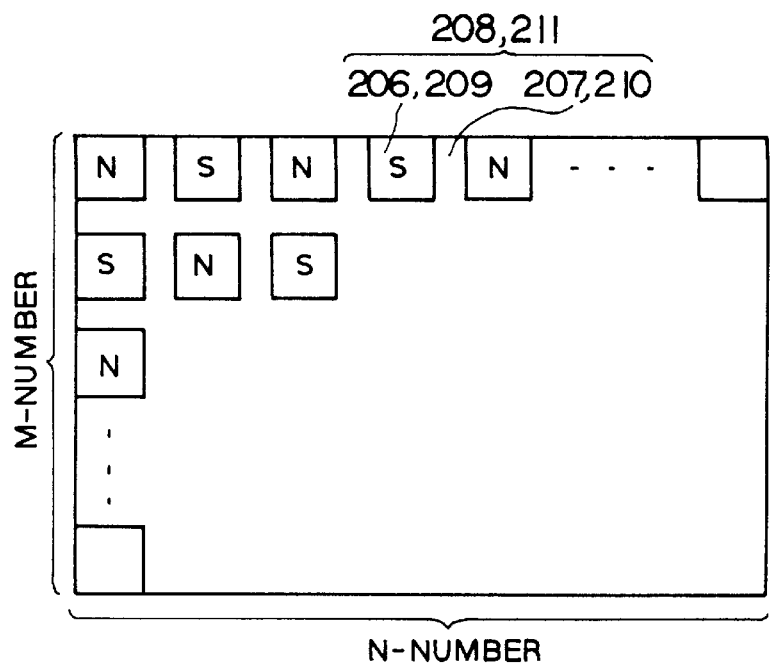
FIG. 24 is a view showing the arrangement of a twentieth embodiment of the dynamic vibration absorber according to the present invention.

The number of the magnets disposed longitudinally is changed from the number of them disposed laterally without changing the distance between the adjacent magnets of the movable portion rectangular magnets 206 and the fixed portion rectangular magnets 209 in FIG. 24. However, when the object to be damped has a different frequency in two directions, a damping effect can be exhibited in accordance with the different frequency likewise the embodiment having such an arrangement that the distance between adjacent magnets disposed longitudinally is changed from the distance between adjacent magnets disposed laterally without changing the number of the magnets disposed longitudinally from the number of them disposed laterally.

Further, since the rectangular magnet having an aspect ratio set to about 1 is exemplified in FIG. 24, a rectangular shape having a longer lateral side along which the greater number of the magnets are disposed is obtained as a whole by changing the numbers of the magnets disposed along the lateral side and the longitudinal side. However, the aspect ratio of the rectangular magnet need not always be 1. For example, when rectangular magnets each having a large aspect ratio are disposed longitudinally and laterally, a side along which the greater number of the magnets is disposed is not always a longer side, thus the degree of freedom of the lengths of a longitudinal side and a lateral side being increased as a whole.

Figure 25:
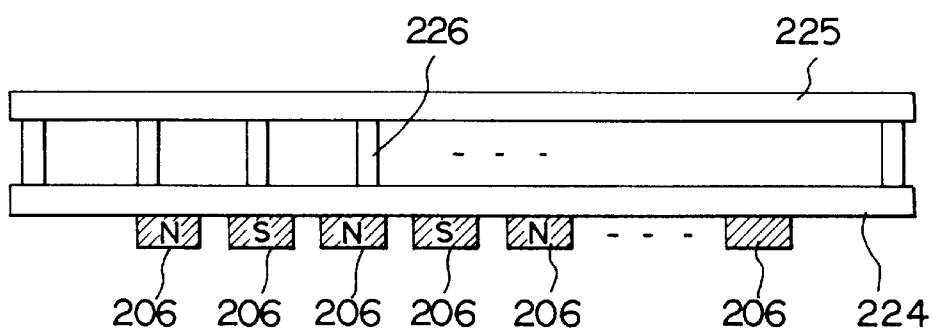
FIG. 25 is a longitudinal cross sectional view showing a twenty-first embodiment of the dynamic vibration absorber according to the present invention.

A twenty-first embodiment of the dynamic vibration absorber according to the present invention will be described with reference to FIG. 25. In this embodiment, it is contemplated that the yoke 207 constituting a movable portion magnet train 208 is arranged integrally with a movable weight 205, a flat plate 124 to which magnets are fixed is coupled with an upper flat plate 225 through longitudinal ribs 226 to thereby constitute a honeycomb structure as a whole so as to secure external surface rigidity.

With this arrangement, the gap between confronting magnets can be maintained uniform as a whole as well as there is exhibited an effect that a movable weight is horizontally moved by the rolling of rigid balls without any resistance.

Figure 26:
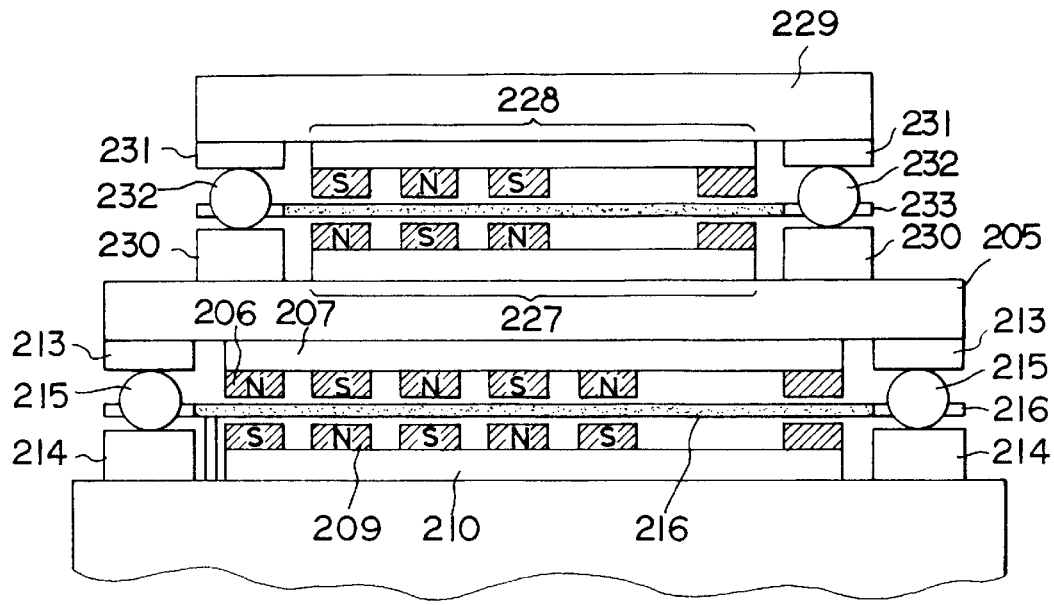
FIG. 26 is a longitudinal cross sectional view showing a twenty-second embodiment of the dynamic vibration absorber according to the present invention.

Next, a twenty-second embodiment of the dynamic vibration absorber according to the present invention will be further described with reference to FIG. 26. In this embodiment, a second fixed magnet train 227 and a second movable magnet train 228 are disposed to the opposite side of a movable portion magnet train 208 likewise the seventeenth and eighteenth embodiments and a second movable weight 229 is supported above a movable weight 205. Second receiving seats 30 are disposed to the movable weight 205 and second receiving seats 31 are disposed to the second movable weight 229, respectively and second rigid balls 232 are held between the second receiving seats 230 and 231. Further, a second conductor plate 233 is disposed to the gap between the second fixed magnet train 227 and the second movable magnet train 228 without in contact therewith.

Although only the one additional unit of the dynamic vibration absorber is placed on the movable weight 205, a plurality of piled units, each of which is composed of the second fixed magnet train 227 each composed of the second movable magnet train 228, the second movable weight 229, the second receiving seats 230, 231 and the second conductor plate 233 may be placed on the movable weight 205.

A plurality of frequencies of an object to be damped can be coped with by such an arrangement that the movable weights 205 of the dynamic vibration absorber are piled to a plurality of stages to provide a plurality of degrees of freedom and the respective movable weights 205 are supported by a multiplicity of magnets which are disposed in confrontation with each other and whose disposed number is adjusted to thereby adjust the frequencies.

Figure 27:
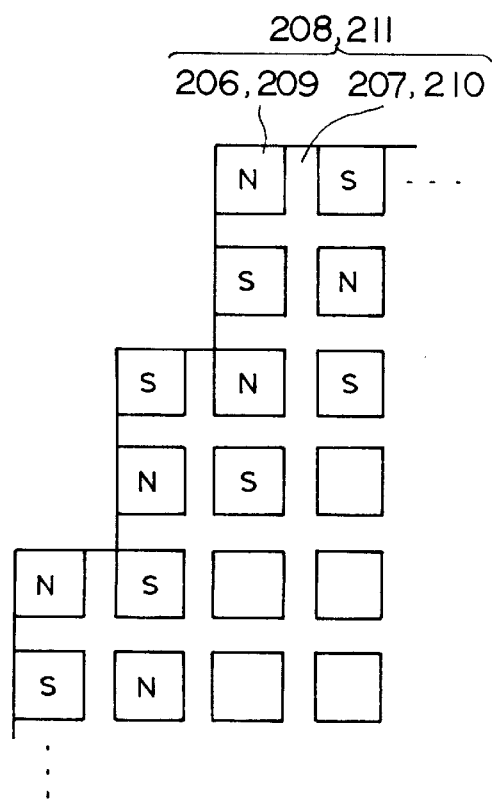
FIG. 27 is an illustration showing the arrangement of a twenty-third embodiment of the dynamic vibration absorber according to the present invention.

Finally, a twenty-third embodiment of the dynamic vibration absorber according to the present invention will be described with reference to FIG. 27. This embodiment has an arrangement in which the number of movable portion rectangular magnets 206 and fixed portion rectangular magnets 209 disposed along the periphery thereof on a horizontal surface is optionally adjusted depending upon a location to thereby optionally set the outermost peripheral shape of a movable portion magnet train 208 and a fixed portion magnet train 211.

In this embodiment, a space in which magnets are disposed can be reduced when the external shape of the dynamic vibration absorber is optionally set.

Figure 21:
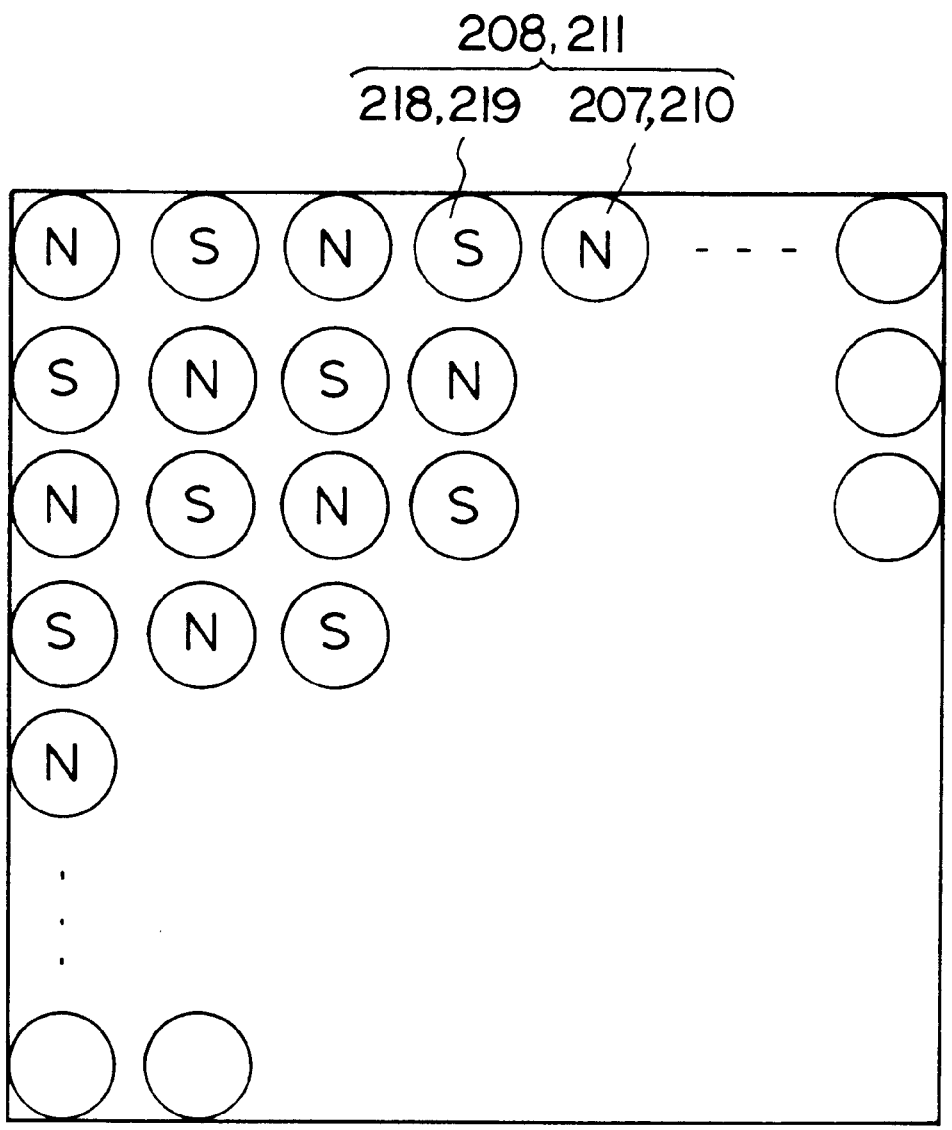
FIG. 21 is a view showing the arrangement of an eighteenth embodiment of the dynamic vibration absorber according to the present invention.

Furthermore, the disposition shown in this embodiment is also applicable to the disposition of the movable portion circular magnets 218 and the fixed portion circular magnets 219 in the eighteenth embodiment of the dynamic vibration absorber according to the present invention described in view of FIG. 21.

Although the dynamic vibration absorber of the seventeenth embodiment to the twenty-third embodiment is described as to the case in which it is placed on the object to be damped, the dynamic vibration absorber is also applicable to the case in which the object to be damped is suspended and the absorber is installed on the lower surface thereof because the drop of the movable weight 205 is prevented by the magnetic force between the movable portion rectangular magnets 206 and the fixed portion rectangular magnets 209.

As described above, according to the seventeenth to twenty-third embodiment of the dynamic vibration absorber of the present invention, since the movable weight is supported by the magnetic restoring force in a two-dimensional direction, a damping effect to a two-dimensional direction can be obtained by the single movable weight. Further, since the conductor plate interposed between the confronting magnets also serves as a magnetic damper, all the spring element and the damping element can be accommodated below the movable weight and a larger restoring force can be obtained as compared with that of a large magnet having the same confronting area by the disposition of the multiplicity of small magnets, the size and weight of the dynamic vibration absorber can be greatly reduced.

What is claimed is:

1. A dynamic vibration absorber comprising:
   a movable portion including a movable weight portion;
   a movable portion magnet assembly provided with a movable inside magnet and a movable outside magnet which are mounted to the movable weight portion through a yoke so poles of opposite polarity are adjacent one another;
   a fixed portion fixed to an object to be damped;
   a fixed portion magnet assembly opposing the movable portion magnet assembly and provided with a fixed portion inside magnet and a fixed portion outside magnet mounted to the fixed portion through a yoke so that the fixed portion magnet assembly has magnetic poles of opposite polarity than those of respective movable portion magnet poles in opposed positions; and
   a conductor plate disposed in a gap defined between the opposing, opposite polarity poles of the fixed portion magnet assembly and the movable portion magnet assembly.

2. A dynamic vibration absorber according to claim 1, further comprising a movable portion bearing receiving seat disposed to the movable portion, a fixed portion bearing receiving seat disposed to the fixed portion and rigid balls held between the movable portion bearing receiving seat and the fixed portion bearing receiving seat for permitting a relative motion between the movable portion and the fixed portion and the movable portion bearing receiving seat, wherein the movable portion bearing receiving seat and the fixed portion bearing receiving seat are disposed inwardly of the movable portion outside magnet and the fixed portion outside magnet, respectively.

3. A dynamic vibration absorber according to claim 2, further comprising bearing support rings disposed in a gap between the movable portion inside magnet and the movable portion outside magnet and a gap between the fixed portion inside magnet and the fixed portion outside magnet, respectively, to thereby fix the movable portion bearing receiving seat and the fixed portion bearing receiving seat, respectively.

4. A dynamic vibration absorber according to claim 2, further comprising a movable portion conductor plate which is fixed to the movable weight portion and to which the movable portion bearing receiving seat is fixed integrally therewith, a fixed portion conductor plate which is fixed to the fixed portion and to which the fixed portion bearing receiving seat is fixed integrally therewith, said rigid balls being held between the movable portion bearing receiving seat and the fixed portion bearing receiving seat to permit a relative motion between the movable portion and the fixed portion.

5. A dynamic vibration absorber according to claim 2, wherein at least one intermediate magnet is disposed between the movable portion magnet assembly and the fixed portion magnet assembly through additional bearing receiving seats and additional rigid balls and is provided with magnets of different magnetic poles disposed to an upper portion and a lower portion across a yoke, in an installed state, in a manner of opposing to the movable portion magnet assembly and the fixed portion magnet assembly.

6. A dynamic vibration absorber according to claim 1, wherein the fixed portion outside magnet having the same magnetic pole as that of the movable portion outside magnet is disposed outwardly of the fixed portion outside magnet confronting the movable portion outside magnet.

7. A dynamic vibration absorber comprising:

a movable portion including a movable weight portion;

a movable portion magnet assembly comprising a plurality of rectangular magnets magnetized in a vertical direction and longitudinally and laterally disposed on a horizontal surface of the movable weight portion, in an installed state, through a back yoke, with a predetermined distance therebetween so that adjacent magnets have opposite poles;

a fixed portion fixed to an object to be damped;

a fixed portion magnet assembly comprising a plurality of fixed portion magnets having the same shape as that of the movable portion magnet assembly and longitudinally and laterally disposed to the object to be damped through a back yoke, with a predetermined distance therebetween so as to oppose the movable portion magnet assembly with poles of opposite polarity than those of the movable rectangular magnets;

a magnetic flux created by the opposing, opposite polarity magnets being perpendicular to a relative movement between the movable portion magnet assembly and the fixed portion magnet assembly;

a conductor plate disposed between the opposing, opposite polarity poles of the movable portion magnet assembly and the fixed portion magnet assembly so as not to be in contact therewith;

a movable portion bearing receiving seat disposed to the movable weight portion;

a fixed portion bearing receiving seat disposed to the object to be damped; and rigid balls held between the movable portion bearing receiving seat and the fixed portion bearing receiving seat to permit the movable weight portion to be horizontally movable.

* * * * *